(12) United States Patent
Moser et al.

(10) Patent No.: US 7,199,956 B1
(45) Date of Patent: Apr. 3, 2007

(54) DISK DRIVE SELF-SERVO WRITING USING FUNDAMENTAL AND HIGHER HARMONICS OF A PRINTED REFERENCE PATTERN

(75) Inventors: Michael Anthony Moser, San Jose, CA (US); Ara Patapoutian, Westborough, MA (US); Peter McEwen, deceased, late of Porter, TX (US); by John McEwen, legal representative, Porter, TX (US); Bin Liu, Newark, CA (US); Bruce Buch, Westborough, MA (US)

(73) Assignee: Maxtor Corporation, Scotts Valley, CA (US)

( * ) Notice: Subject to any disclaimer, the term of this patent is extended or adjusted under 35 U.S.C. 154(b) by 403 days.

(21) Appl. No.: 10/251,270

(22) Filed: Sep. 20, 2002

Related U.S. Application Data

(60) Provisional application No. 60/324,117, filed on Sep. 21, 2001.

(51) Int. Cl.
*G11B 5/00* (2006.01)
*G11B 5/09* (2006.01)
*G11B 20/10* (2006.01)
*G11B 5/02* (2006.01)
*G11B 21/02* (2006.01)
*G11B 5/596* (2006.01)

(52) U.S. Cl. ............... 360/46; 360/32; 360/39; 360/67; 360/75; 360/77.05

(58) Field of Classification Search ............ None
See application file for complete search history.

(56) References Cited

U.S. PATENT DOCUMENTS

| | | | | |
|---|---|---|---|---|
| 5,012,363 | A | 4/1991 | Mine et al. | 360/77.05 |
| 5,668,679 | A | 9/1997 | Swearingen et al. | 360/75 |
| 6,738,205 | B1 * | 5/2004 | Moran et al. | 360/17 |
| 2002/0150179 | A1 * | 10/2002 | Leis et al. | 375/340 |

OTHER PUBLICATIONS

U.S. Appl. No. 09/903,445, filed Jul. 8, 2001, Moran et al.

* cited by examiner

*Primary Examiner*—William Korzuch
*Assistant Examiner*—Daniell L. Negrón
(74) *Attorney, Agent, or Firm*—Tejpal S. Hansra

(57) ABSTRACT

Disk drive self-servo writing includes transferring a reference pattern by magnetic printing onto a reference disk, wherein the resulting printed reference pattern includes embedded servo information that provides servo timing and head position information, installing the reference disk and a head into the disk drive, reading the printed reference pattern using the head to generate a readback signal, sampling the readback signal at a sampling rate to generate a sampled signal, processing the sampled signal waveform spectrum to generate a recovered signal including the embedded servo information and fundamental and higher harmonics of the sampled signal, using the embedded servo information from the recovered signal to precisely position and maintain the head at concentric tracks of the reference disk, and self-writing servo patterns onto the tracks with the head.

160 Claims, 21 Drawing Sheets

DISK DRIVE SELF-SERVO WRITING USING FUNDAMENTAL AND HIGHER HARMONICS OF A PRINTED REFERENCE PATTERN

RELATED APPLICATION

This application claims priority from U.S. Provisional Application No. 60/324,117, entitled "Demodulation Of Low Density Printed Media Bursts Using Information From Higher Harmonics", filed on Sep. 21, 2001, which is incorporated herein by reference.

FIELD OF THE INVENTION

The present invention relates generally to writing servo patterns on a disk, and more particularly, to disk drive self-servo writing using a printed reference pattern on a disk.

BACKGROUND OF THE INVENTION

In many processing and computing systems, magnetic data storage devices such as disk drives are used for storing data. A typical disk drive includes a spindle motor for rotating one or more data storage disks having data storage surfaces, a head arm that supports one or more transducer heads, and an actuator for moving the heads radially across the disks to enable the heads to write data to and read data from concentric tracks on the disks.

In general, the head is positioned very close to the corresponding disk surface. Typical clearance between the head and a smooth disk surface is about one microinch or less. The close proximity of the head to the disk surface allows recording very high resolution data and servo patterns on the disk surface. Servo patterns are typically written into servo sectors with uniform angular spacing of the servo sectors and data sectors or blocks interleaved between the servo sectors. An example servo pattern includes circumferentially sequential, radially staggered single frequency bursts. Servo patterns provide the disk drive with head position information to enable the actuator to move the head from starting tracks to destination tracks during random access track seeking operations. Further, the servo patterns provide the disk drive with head position information to enable the actuator to position and maintain the head in proper alignment with a track during track following operations when user data is written to or read from the available data sectors in concentric tracks on the disk surface.

Heads currently use dual elements. An inductive write element having a relatively wide recording gap writes information in the tracks, and a read element such as a giant magneto-resistive (GMR) sensor having a relatively narrow playback gap reads information from the tracks. With this arrangement, track densities equaling and exceeding 30,000 tracks per inch (TPI) are possible.

In a standard manufacturing process, a head-disk assembly (HDA) of the disk drive is assembled in a clean room and then transported to a specialized servo writer where the HDA is mounted on a stabilized metrological measurement system. The drive modules are then assembled to the HDA and the drive is moved to a self-scan station where the drive is tested for reliable servo operation. Block error information, drive defect information, drive specific control track information and other information is written to the drive at this station. If the drive fails the self-scan tests, it is either reworked or scrapped at this late manufacturing stage.

Conventionally, servo patterns are written into the servo sectors of each disk using a servo writer in the drive assembly process before the HDA is sealed against particulate contamination. The servo writer is a complex and expensive machine, typically stabilized on a large granite base to minimize unwanted vibration, and employs laser interferometry for precise position measurements. The servo writer typically requires direct mechanical access to the head arm and includes a fixed head for writing a clock track onto a disk surface.

Because of the need for direct access to the interior of the HDA, servo writers are typically located within a clean room where air is purged of impurities that might otherwise interfere with the servo writing or normal drive operation after manufacturing. Servo writers occupy a large portion of the clean room factory floor. Further, servo-writing by the servo writer is very time consuming. In one example, a disk drive having two disks with four disk surfaces can require three servo writer controlled passes of the head over a single track, consuming a total servo writing time as long as 13.2 minutes. Thus, servo writing using servo writers in clean rooms requires both considerable is capital investment and severe time penalties attributable to servo writer bottlenecks. Further, as track densities increase with evolving disk drive designs, servo writers have to be replaced or upgraded at considerable capital expense.

An attempt to alleviate the above shortcomings is directed to servo writing a reference pattern at full resolution on one surface of a reference disk during a pre-assembly operation. The reference disk with the reference pattern is assembled with blank disks into an HDA. After the disk drive is sealed, the disk drive uses the reference pattern to self-write embedded servo patterns on each disk surface within the disk drive. Finally, the reference pattern is erased, leaving the disk drive with properly located servo patterns on every disk surface, including the disk surface which originally included the reference pattern. An example of self-servo writing is described in U.S. Pat. No. 5,012,363 to Mine et al. entitled "Servo Pattern Writing Method For A Disk Storage Device". However, a disadvantage of this approach is that certain repeatable runout (RRO) information must be removed during the self-servo write operation. Another disadvantage is that a servo writer is required to write the reference pattern on the reference disk.

A self-servo writing method which eliminates the need for servo writers is described in commonly assigned U.S. Pat. No. 5,668,679 to Swearingen et al. entitled "System For Self-Servo Writing A Disk Drive", the disclosure thereof being incorporated herein by reference. This method includes writing a clock track at an outer diameter (OD) recording region of a disk surface of a disk drive, tuning an open-loop seek from the OD to an inner diameter (ID) recording region of the disk surface to develop a repeatable seek profile, and recording high frequency spirals from the OD to the ID with each spiral including embedded (e.g. missing bit) timing information. Then spiral provided peak data and missing bit data are read back. A voltage controlled oscillator (VCO) is locked to the timing information to track disk angular position. As the head is moved radially from the OD to the ID, the detected spiral peaks shift in time relative to a starting (index) mark although the timing information does not shift. Servo patterns can then be precisely written across the disk surface by multiplexing between reading the spirals and writing the servo patterns. After the integrity of the servo patterns has been verified, the spirals are erased (overwritten with user data). While this method is satisfactory, challenges remain in generating and recording an accurate clock track on the disk surface. Further, the time required to produce the spirals on the disk surface can be lengthy.

Another approach involves the use of a low resolution (low density) reference pattern (bursts) transferred to a reference disk by magnetic printing, and self-servo writing high resolution final servo patterns using the reference pattern. The reference disk with the magnetically printed reference pattern is known as printed media. However, printed media signal-to-noise ratio (SNR) is marginal for existing disk drives due to the low pattern density available with current printing techniques. One conventional approach to improving the SNR of printed media involves reducing the feature size in the printed media to increase the reference pattern density, but this is not practical due to limitations in optics and lithography. Another approach is increasing the length of the reference pattern bursts (every doubling of burst length improves SNR by 3 dB) but the disk real estate available for more than one doubling is expensive. In another approach, increasing the angle of the bursts leads to smaller feature sizes but this also leads to printing difficulties as the angle increases. Yet another approach involves zoned printing by changing the reference pattern density at the disk ID and OD zones to improve the SNR but this leads to difficulties patching the reference patterns between the zones (particularly in the presence of eccentricity).

For printed media reference patterns, the limitations in spatial resolution of the printing process make it impractical to space transitions as closely as the servo patterns that are self-written with the disk drive heads. When existing digital demodulation techniques are used on the printed reference pattern, the resulting signal has significantly lower SNR than the servo patterns. There is a need for improving the SNR of printed media reference patterns used for disk drive self-servo writing.

BRIEF SUMMARY OF THE INVENTION

The present invention addresses the above problems. In one embodiment, the present invention provides a demodulation technique for a printed reference pattern that measures the fundamental (first) harmonic in combination with one or more higher harmonics. A digital demodulator is used in the disk drive. In one example, the demodulator measures the first, third and fifth harmonics using a discrete Fourier transform (DFT) based calculation. A data sampling rate is selected that supports measuring the three harmonics after filtering and decimation. The three phases are then combined to obtain a weighted average phase. Combining the odd harmonics can improve the SNR by close to 13 dB. This greatly extends the usable lifetime of the printed media and makes it extendable to very high track densities.

In another embodiment, the present invention provides disk drive self-servo writing by transferring a reference pattern by magnetic printing onto a reference disk, wherein the resulting printed reference pattern includes embedded servo information that provides servo timing and head position information. The disk drive is assembled by installing the heads, the reference disk and blank disks into an HDA and then enclosing the HDA within a housing sealed against particulate contamination. The printed reference pattern is then read from the reference disk by a head to generate a readback signal that is sampled at a sampling rate to generate a sampled signal. The sampled signal is processed to generate a recovered signal that includes a fundamental harmonic of the sampled signal and one or more higher harmonics of the sampled signal representing the embedded servo information. The embedded servo information from the fundamental and higher harmonics is used to precisely position and maintain the heads at concentric tracks of the disk surfaces, and servo patterns are self-written onto the disk surfaces at the concentric tracks with the heads.

The present invention allows the disk drive to be fully assembled and tested in one location at one time. In addition, it eliminates the need for servo writers. The present invention also provides an architecture for the disk drive read/write channel and controller which allows the extraction of embedded servo information from the printed reference pattern for self-servo writing.

BRIEF DESCRIPTION OF THE DRAWINGS

These and other features, aspects and advantages of the present invention will become understood with reference to the following description, appended claims and accompanying figures where:

In the drawings, like reference numbers refer to like elements.

DETAILED DESCRIPTION OF THE INVENTION

In one embodiment, the present invention provides self-servo writing servo patterns in a disk drive using a printed reference pattern. The printed reference pattern is printed on a reference disk by magnetic printing, and in one example includes magnetic segments having magnetic transitions wherein the direction of magnetization is generally along the circumferential direction of circular concentric disk tracks. Spatial separation between proximately printed segments is used to obtain phase information that provides timing and position information for positioning the heads over the tracks for self-servo writing of servo patterns without a servo writer.

Figure 1:
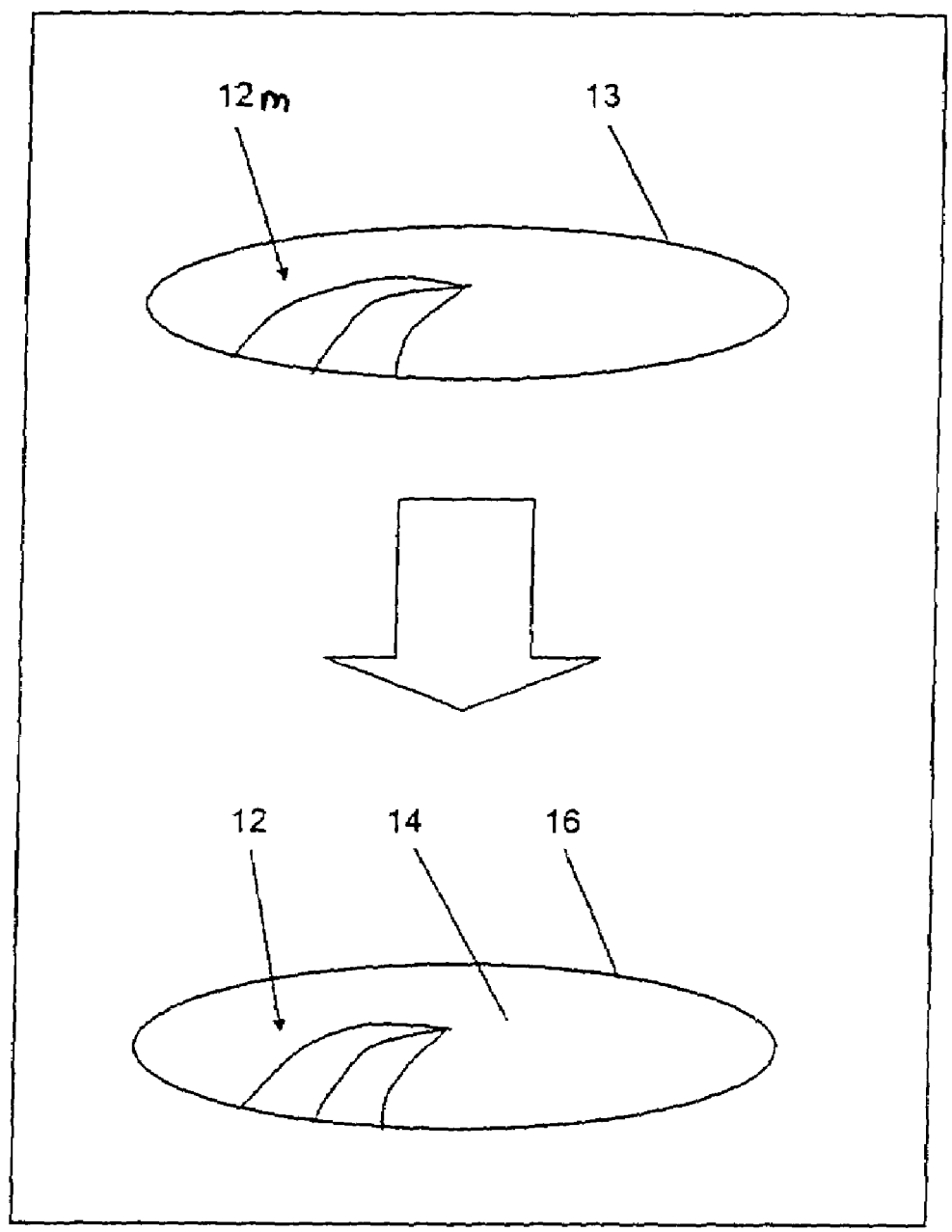
FIG. 1 shows a diagrammatic view of a magnetic printing station for printing a reference pattern on a reference disk.

Referring to FIG. 1, a magnetic printing station 10 magnetically prints a mask reference pattern 12m from a mask 13 onto a disk surface 14 of a magnetic reference disk 16, as indicated by the block arrow, thereby forming a printed reference pattern 12 on the disk surface 14 of the reference disk 16. In this manner, the magnetic printing station 10 transfers the printed reference pattern 12 onto the reference disk 16. The magnetic printing station 10 can use known magnetic transfer methods. One such method includes applying a unidirectional magnetic domain orientation to the reference disk 16 while the reference disk 16 is blank. A reticle or magnetic die having the desired reference pattern is then placed in close proximity to the disk surface 14, and the reference disk 16 is heated to approach the Curie temperature of the storage media for the disk surface 14. The disk surface 14 is selectively remagnetized with the aid of a reverse bias field and localized heating in accordance with the mask reference pattern 12m established by the reticle or die. If an optical reticle is used, intense local heating through reticle apertures can be obtained from a laser beam in accordance with well understood magneto-optical principles to provide selective magnetization of domains of the disk surface 14 in accordance with the mask reference pattern 12m. Care must be taken during the magnetic printing process not to damage or contaminate the reference disk 16. Preferably, the magnetic printing process is carried out in a very clean environment within a disk manufacturing process.

Figure 2:
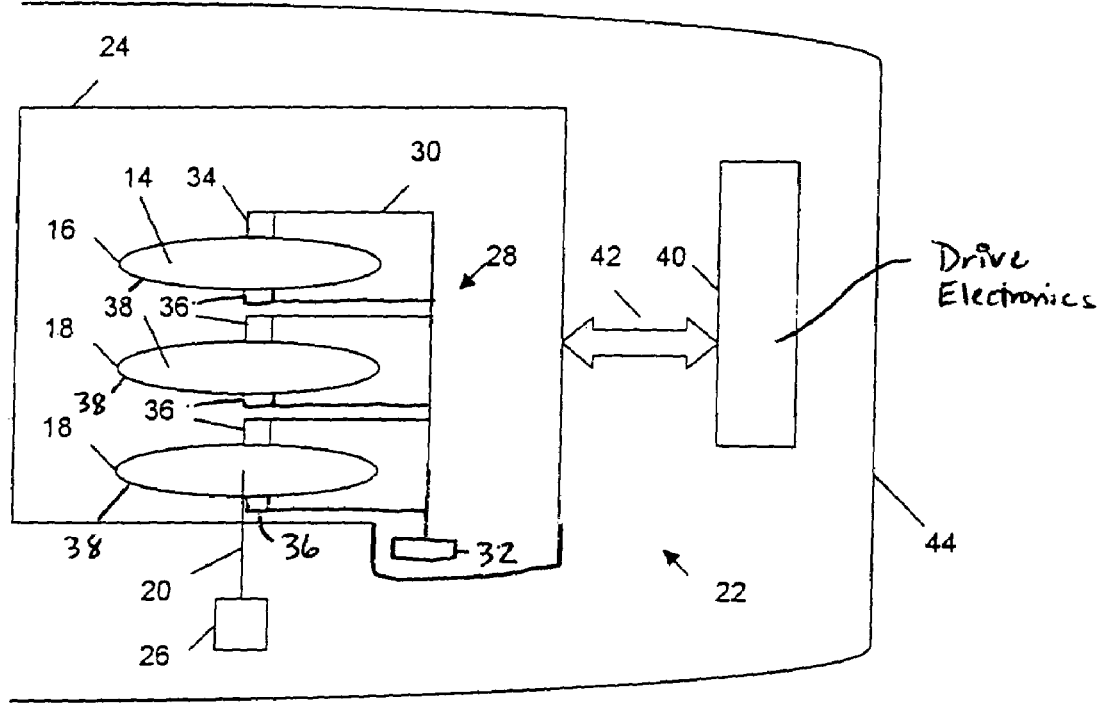
FIG. 2 shows a diagrammatic view of a hard disk drive including the reference disk, several blank disks and the drive electronics for self-servo writing based on the printed reference pattern.

Referring to FIG. 2, after the printed reference pattern 12 has been applied to the disk surface 14, the reference disk 16 and other disks 18 are assembled onto a spindle 20 of a disk drive 22 being assembled. Disks 18 are blank at this stage. The spindle 20 is mounted within a head-disk assembly (HDA) 24 and is rotated at a predetermined angular velocity by a spindle motor 26. A comb-like head actuator assembly 28 is included in the HDA 24. The head actuator assembly 28 includes head arms 30 rotated by a rotary voice coil motor (VCM) 32 to position transducer heads 34 and 36 adjacent to the disk surface 14 of the reference disk 16 and to the disk surfaces 38 of the disks 16 and 18. The disk surface 14 is the top surface of the reference disk 16, and the disk surfaces 38 are the bottom surface of the reference disk 16 and the top and bottom surfaces of the disks 18. The disk surfaces 38 are blank at this stage. After the disks 16 and 18 and the heads 34 and 36 are installed, the HDA 24 is enclosed by a cover to prevent unwanted particulate contamination. The drive electronics 40, such as a printed circuit board (PCB) carrying large scale integrated circuits and other components, is mechanically attached to the HDA 24 and is electrically connected to the HDA 24 by a suitable interconnection 42 to complete the mechanical assembly of the disk drive 22. The disk drive 22 is then placed in a self-scan station 44 and connected to a suitable power supply, and a control and status collection computer (not shown) collects data about the disk drive 22 during self-scan procedures.

The drive electronics 40 enables the head 34 to read the printed reference pattern 12, and in turn enables the heads 34 and 36 to write precise servo patterns on the disk surfaces 14 and 38 in accordance with a final/product servo pattern features plan. Further, the printed reference pattern 12 is overwritten either with the servo patterns in the self-scan station 44 or later with user data when the disk drive 22 is installed in a user computing environment for data storage and retrieval operations.

Figure 3:
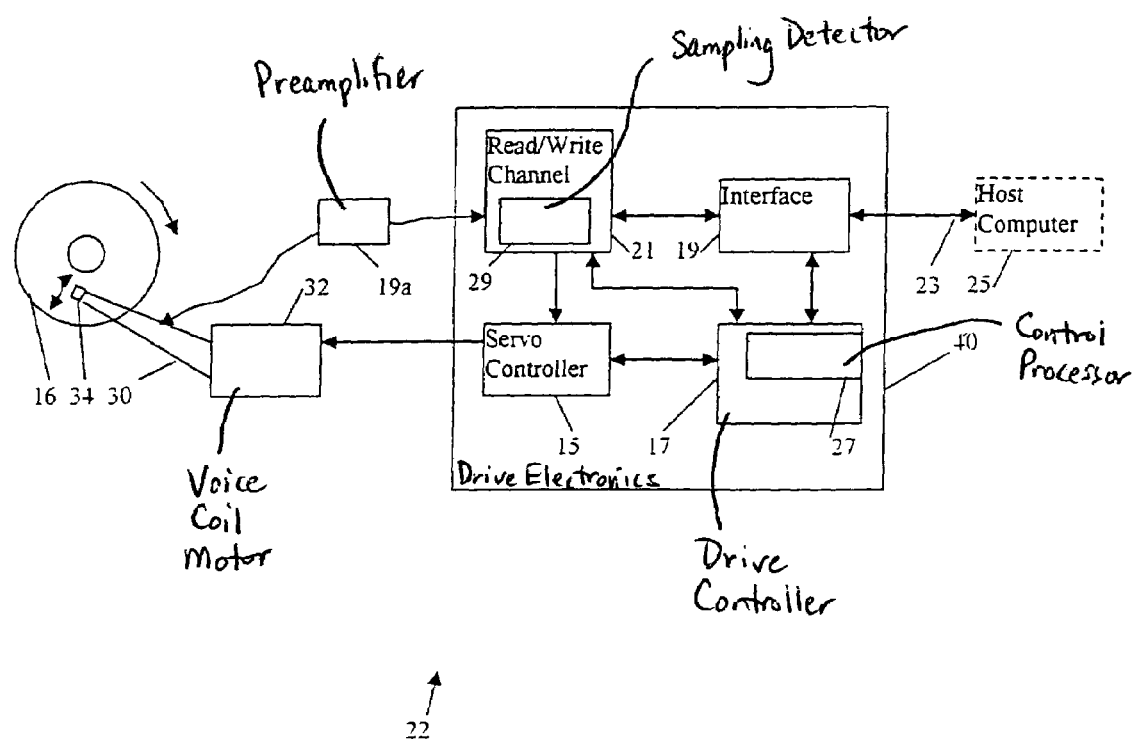
FIG. 3 shows a simplified diagram of the disk drive and a host computer.

Referring to FIG. 3, the disk drive 22 is connected to a host computer 25 via a bus 23. The host computer 25 can include the status collection computer. The drive electronics 40 includes a servo controller 15 for servo control of the disk drive 22, a drive controller 17 for controlling components of the disk drive 22, a control processor 27 in the drive controller 17 primarily for controlling data flow communications with the host computer 25 via an interface 19 and the bus 23, and a read/write channel 21 for processing the data transferred between the disks 16 and 18, the host computer 25, the servo controller 15 and the drive controller 17. A preamplifier 19a amplifies the signals read by the heads 34 and 36. Alternatively, the servo controller 15 can be a component of the drive controller 17. The drive controller 17 can be implemented as an ASIC, and the channel 21 can be implemented as a chip. The disk drive 22 receives read and/or write requests from the host computer 25 and carries out the requests by performing data transfers between itself and the host computer 25.

The interface 19 provides an interface between the disk drive 22 and the host computer 25. During read and write operations, the interface 19 provides a communications path that includes data buffering between the host computer 25 and the channel 21. In addition, the interface 19 receives commands and requests from the host computer 25 and directs them to the drive controller 17. The drive controller 17 then carries out the commands by appropriately controlling the elements within the disk drive 22.

The VCM 32 controllably positions the heads 34 and 36 with respect to their corresponding disk surfaces 14 and 38 in response to a control signal generated by the servo controller 15. The heads 34 and 36 are coupled to the head actuator assembly 28 (FIG. 2) and thus move together under the influence of the VCM 32. When performing a read or write operation, the drive controller 17 instructs the servo controller 15 to move one of the heads 16 and 18 to a target track on a corresponding disk surface 14 and 38 so that a data transfer can take place.

The channel 21 receives an amplified signal from the preamplifier 19a. The channel 21 includes a sampling detector 29 coupled to the preamplifier 19a for digitally sampling the analog readback signal read from the disks 16 and 18. The sampling digital detector 29 can include a digital sampler (i.e., an analog-to-digital converter) and a digital detector such as a Viterbi detector (e.g., partial response mode 4 (PR4), extended partial response mode 4 (ERP4)), a decision feedback equalizer (DFE), etc.

Figure 4:
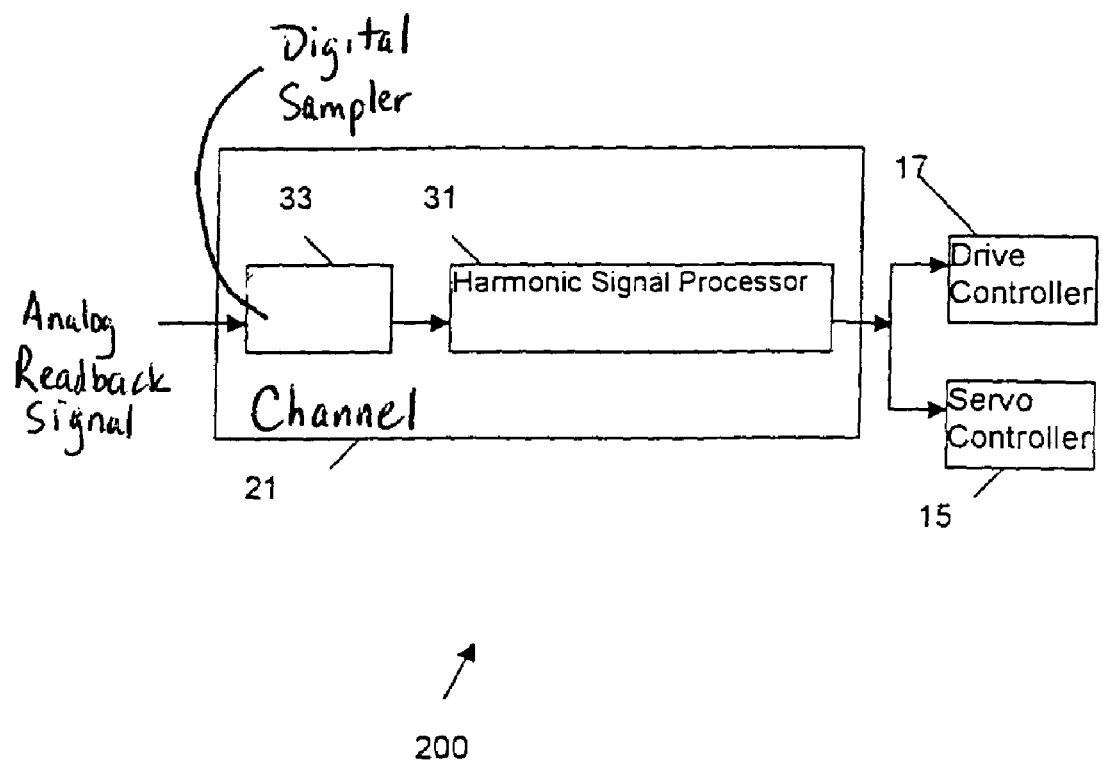
FIG. 4 shows a simplified block diagram of a servo controller, a drive controller and a channel in the drive electronics.

Referring to FIG. 4, another embodiment of the channel 21 is shown including a digital sampler 33 and a harmonic signal processor 31 that receives digital samples from the digital sampler 33. The harmonic signal processor 31 includes a low-pass filter and a downsampler (e.g., a 1-to-N downsampler) for generating synchronous samples representing the analog readback signal of the printed reference pattern 12. The harmonic signal processor 31 extracts the fundamental and desired higher harmonics of the analog readback signal of the printed reference pattern 12 by equalizing and attenuating certain harmonics using digital filters. The channel 21 provides the measurements of the harmonic signal processor 31 to the servo controller 15 and the drive controller 17 for servoing. The harmonic signal processor 31 can also be implemented in the drive electronics 40 outside the channel 21. The controllers 15 and/or 17 can include integrated circuit processor chips with the capability of performing floating point arithmetic, integer mathematics, transforms, etc.

Figure 5:
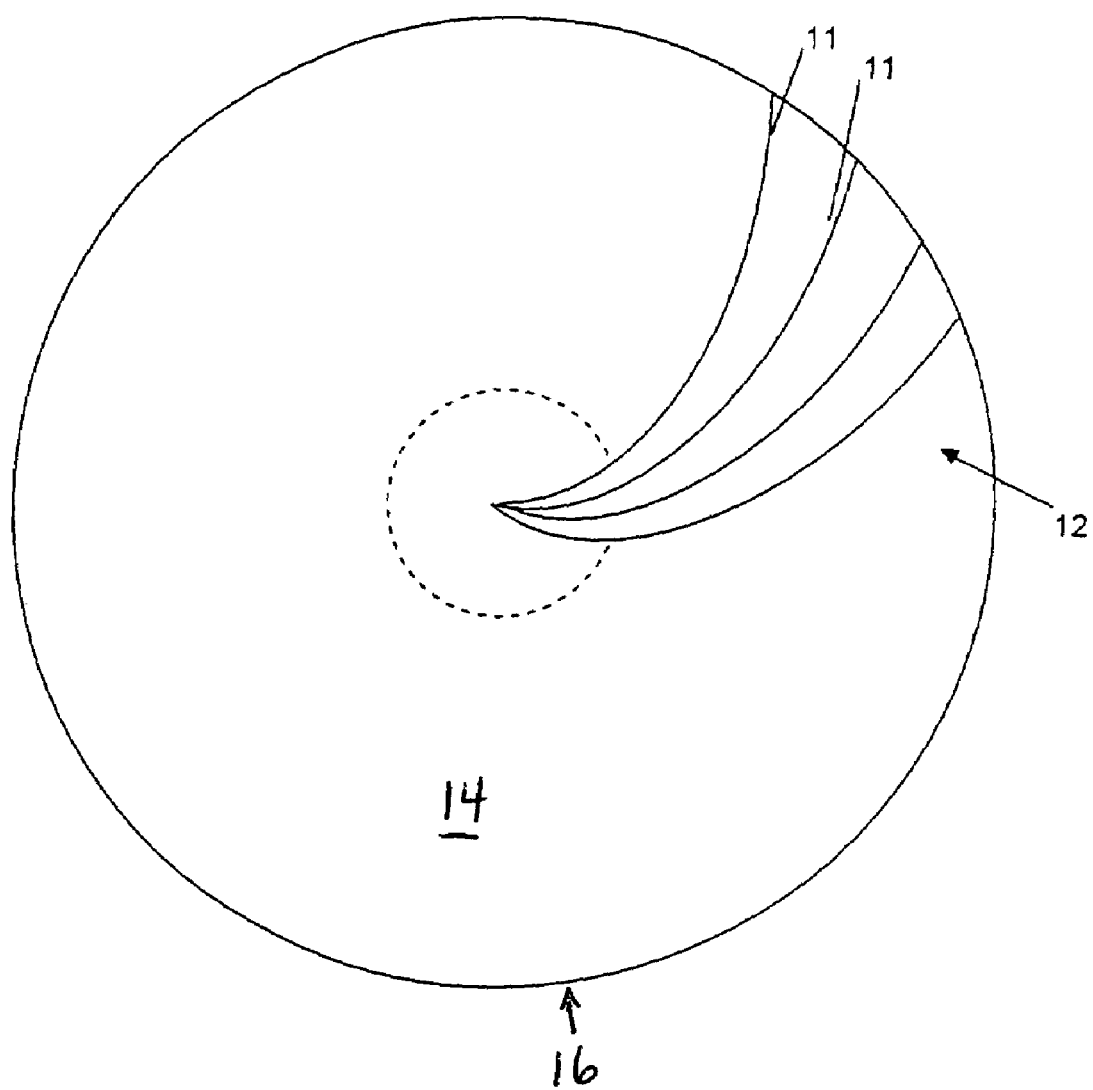
FIG. 5 shows a diagrammatic plan view of the printed reference pattern.

Referring to FIG. 5, a schematic example of the printed reference pattern 12 is shown. Magnetic printing is most effectively accomplished by magnetizing relatively long circumferentially magnetized regions or strips with the long dimension generally in the radial direction of the reference disk 16. Successive stripes in the circumferential direction are magnetized in opposite/transverse directions creating transitions. Fringing fields from these transitions provide a signal recovered during a read operation according to well known methods. The transitions at the long edges are relatively straight and can be read by passing the head 34 over the transitions during a readback operation. The long edge transitions are generally transversely aligned with the travel path of the head 34 about a locus of a circumferential track. The printed reference pattern 12 includes interspaced spokes (arcs) 11 around the disk surface 14 of the reference disk 16 (as shown by the dotted line). Each spoke 11 has servo information that includes (1) servo timing information for providing relative circumferential position information for the head 34, and (2) radial position information for the head 34. The printed reference pattern 12 in the vertical/horizontal scale can be about 95 mm in diameter and have about one hundred spokes 11. Other features and diameters for the printed reference pattern 12 are possible based on the diameter of the reference disk 16.

Figure 6:
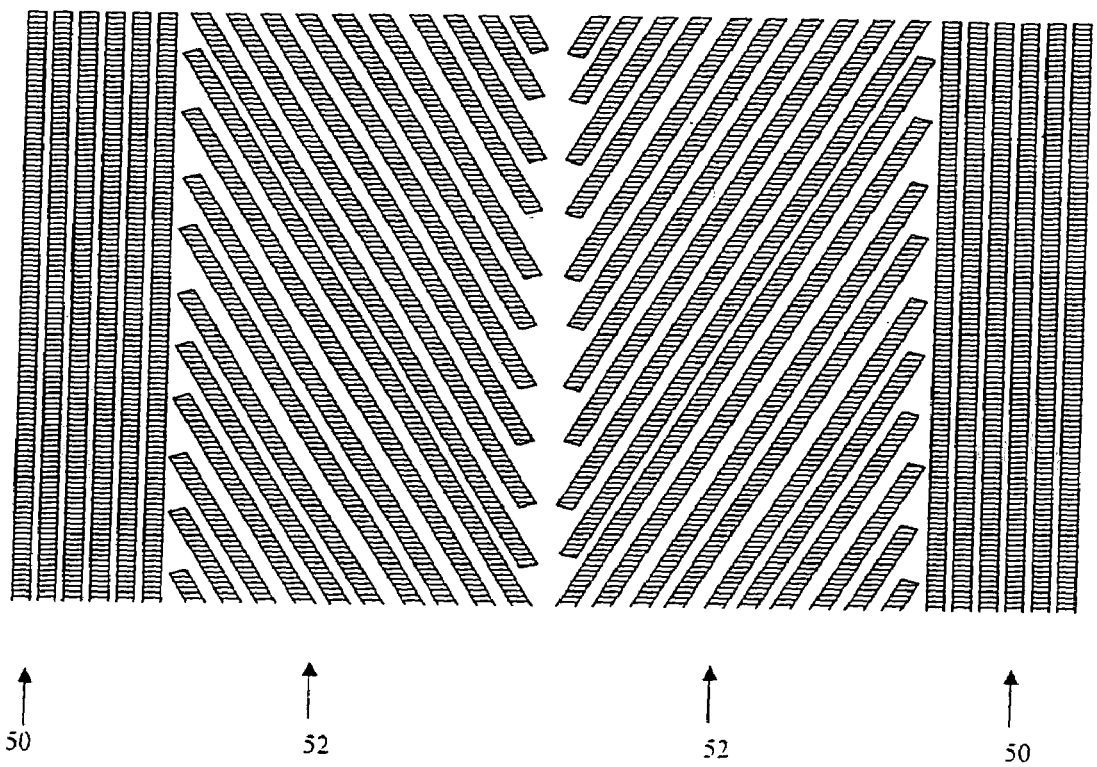
FIG. 6 shows an enlarged schematic plan view of a portion of the printed reference pattern including servo timing information and servo position information with transverse patterns.

FIG. 6 shows an enlarged schematic plan view of a section of an example spoke 11 including servo timing and position information. The servo timing information includes a pattern of substantially radial isochronal timing segments 50, and the servo position information includes a pattern of radially spaced slanted segments 52 (e.g., a zig-zag chevron pattern) that provides the head 34 radial relative position information. Phase detection of a readback signal induced by the timing segments 50 and the slanted segments 52 onto the head 34 as they pass under the head 34 can provide accurate detection of the radial position of the head 34. This relative head 34 position along with any eccentricity of the printed reference pattern 12 is used to sense the absolute position of the head 34 relative to the position of the head 34 over an ideal 11 concentric circular track, and the heads 34 and 36 (FIG. 2) can be steered using the drive electronics 40 to essentially remove the eccentricity or timing non-uniformity and write final servo patterns in concentric circular tracks on the disks 16 and 18.

The slanted segments 52 can include suppressed slanted segments. Where the suppressed segments are not used or provided in the spokes 11, the synchronous samples of the sine and cosine values of the slanted segments 52 are used to compute a phase $\ominus$=arctan(sin(A)/cos(B)), wherein A and B are the quadrature samples of the slanted segments 52. The phase information is used to compute the radial position of the head 34 by using the geometry of the slanted segments 52.

In one case, the phase angle (i.e., the phase difference) between pairs of oppositely/transverse slanted segments 52 (or oppositely inclined/transverse suppressed segments), as the head 34 crosses over them, provides a measure of the radial position of the head 34 and a measure of the radial movement of the head 34 relative to the printed reference pattern 12 from a previous measurement. A phase shift indicates the direction and amount of radial movement of the head 34. The phase angle changes as a function of the radial movement of the head 34, wherein (1) the phase angle decreases if the distance between the transverse pair of slanted segments 52 decreases due to radially inward movement of the head 34, (2) the phase angle increases if the distance between the transverse pair of slanted segments 52 increases due to radially outward movement of the head 34, and (3) the phase angle remains the same if the head 34 does not move radially. To remain at the same radial distance from the center of the reference disk 16, a constant phase angle should be maintained. Similarly, the phase angle between pairs of transverse/oppositely slanted suppressed segments 52 can be utilized to determine larger (e.g., greater than the width of one slanted segment 52) radial movements of the head 34. The heads 34 and 36 can be steered using the drive electronics 40 to write final servo patterns in concentric circular tracks on the disks 16 and 18.

Figure 7:
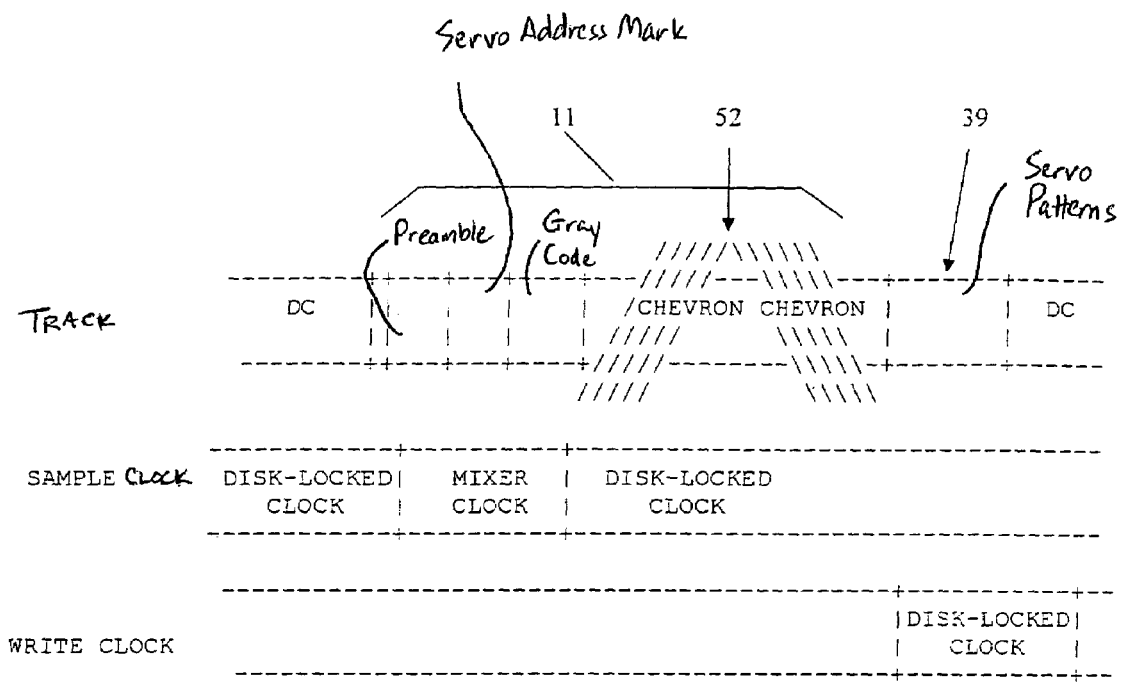
FIG. 7 shows an enlarged schematic plan view of a portion of the printed reference pattern along with a final servo pattern that is self-written by the disk drive using the printed reference pattern.

FIG. 7 shows a portion of another example of the printed reference pattern 12 wherein the final product servo patterns 39 are overwritten on the printed reference pattern 12 on the reference disk 16 in a self-servo write process described further below. In this example, the spokes 11 do not include the timing bursts/segments 50. Each spoke 11 includes progressively a preamble, a servo address mark, a gray code, and slanted segments 52. The gray code used such that both timing and digital synchronous data information can be used to obtain timing information. Timing information can be obtained from either the preamble, gray code or slanted segments 52 in each spoke 11. A Fourier transform can be utilized to obtain the phase angles. The phase angles provide position and timing information in the drive electronics 40 for writing the servo patterns 39 on the disks 16 and 18 using the heads 34 and 36.

Self-Servo Write Overview

Figure 8:
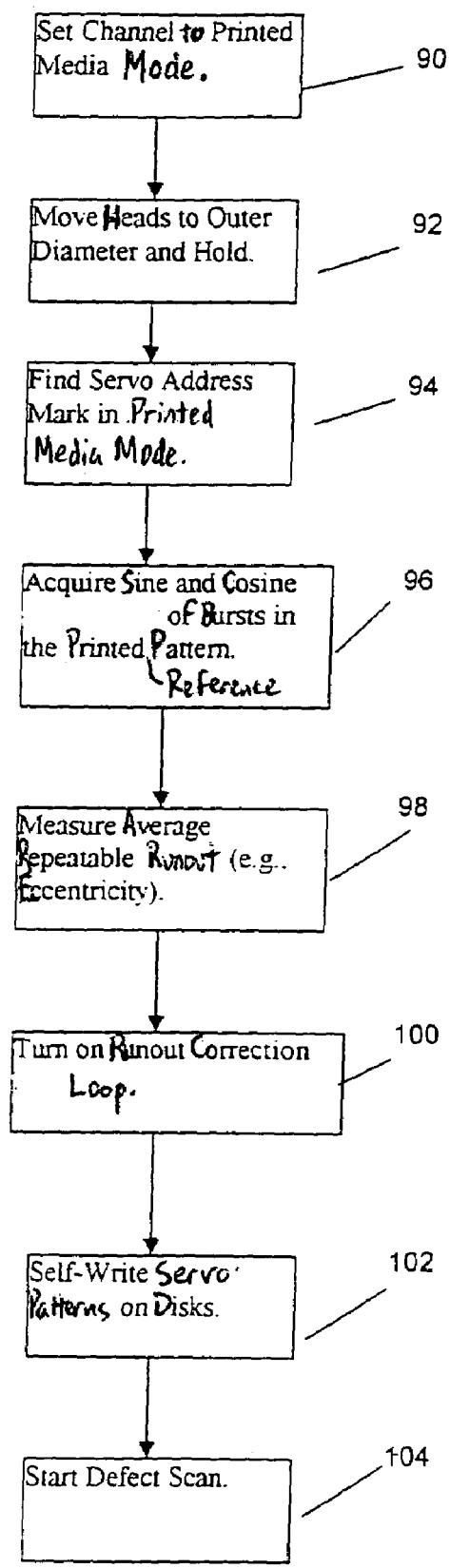
FIG. 8 shows a flow diagram of a self-servo write process.

FIG. 8 shows an example flow diagram of an embodiment of the steps of a self-servo write process according to the present invention. The flow diagram represents the overall operation by which the servo patterns 39 are written to the disks 16 and 18. Each servo pattern 19 is located in a single track and is part of a servo wedge that extends radially across multiple tracks on a single disk surface 14 and 38. After the disk drive 22 is mechanically assembled and plugged into a power rack that includes e.g. SCSI/ATA control, the drive controller 17 (FIG. 3) is signaled to place the drive electronics 40 in printed media mode for self-servo writing (step 90). Then the heads 34 and 36 are moved to the outer diameters of the disks 16 and 18 and held there (step 92). The servo address mark in each spoke 11 (FIG. 7) is found by performing a sync-up operation that includes filtering of the readback signal waveform to shape the signal in the channel 21. Different sampling methods can be used to ensure finding the servo address mark in the right location (e.g., the servo address mark can be found in each spoke 11 using a timer set to create a time window to detect the servo address mark), and upon detecting the servo address mark, the content of the servo address mark is read and used (step 94). One example of the information in the servo address mark is a quality measurement field, and if the quality is lower than a threshold then finding the servo address mark is started over again. Then, sine and cosine measurements of the slanted segments 52 (bursts) are obtained (step 96) and the average repeatable runout (eccentricity) of the printed reference pattern 12 is measured (step 98).

A runout (eccentricity) correction loop in a synchronous data detection circuit system (e.g., system 200 of FIG. 20) is started (step 100). The measured eccentricity of the printed reference pattern 12 is used as a phase error in the correction loop to modulate a synthesized clock to correct for the eccentricity of the printed reference pattern 12 and generate a stable phase coherent write clock for the servo patterns 39. The system initially runs open loop to determine eccentricity of the printed reference pattern 12. The eccentricity measurement is used as phase error information to generate feedback information for both position compensation and timing compensation, thereby closing the correction control loop and writing the servo patterns 39 on the disks 16 and 18 (step 102). Writing the servo patterns 39 on the disks 16 and 18 includes writing a portion of the next track (i.e., writing the servo patterns 39 on the track), stepping the head off-track towards the ID, reprogramming the servo patterns 39 to be written, and repeating this process until all the tracks are written with the servo patterns 39. As the servo patterns 39 are written, the first section of the first track is written while a portion of the next section is written. The remaining portion of the next track is written when the heads 34 and 36 are positioned over that track. After self-servo writing, a defect scan test is performed on the disk drive 22 to detect defects such as those in the servo patterns 39 (step 104).

Figure 9:
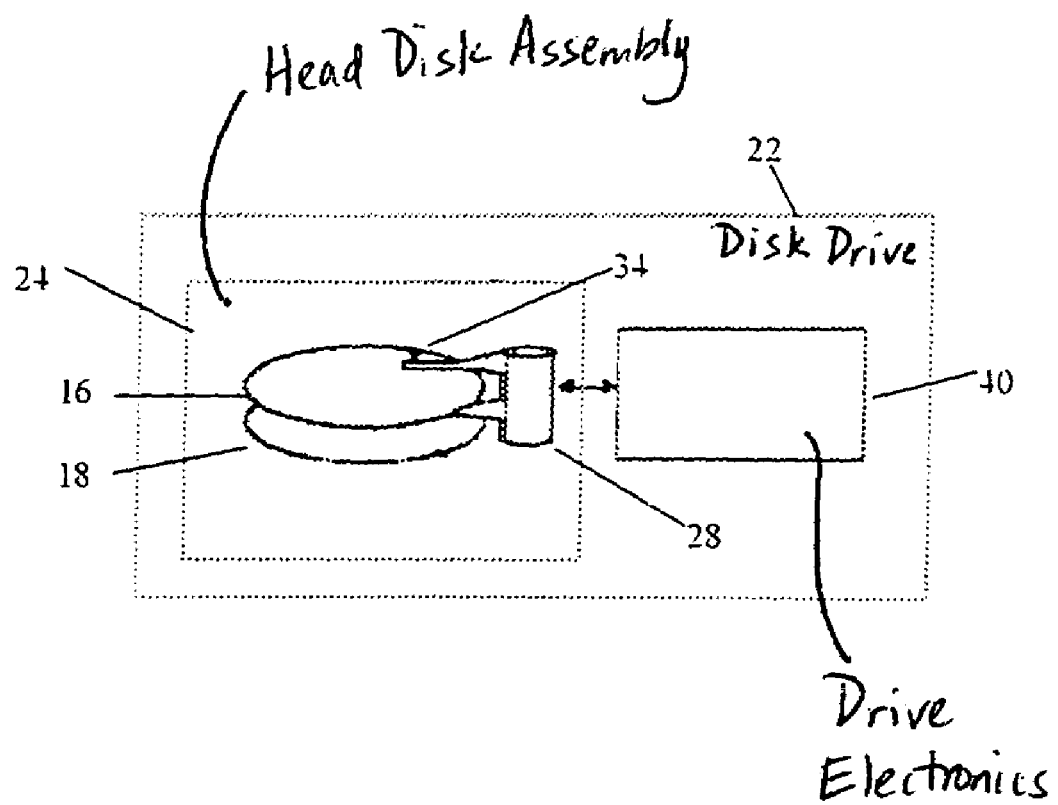
FIG. 9 shows the disk drive configured for self-servo write.

Referring to FIG. 9, the disk drive 22 is configured for self-servo write according to the above steps. The self-servo write scheme includes the reference disk 16 (with the printed reference pattern 12), the HDA 24 with one or more head/disk combinations and the drive electronics 40. The entire servo writing system is contained within the disk drive 22.

Phase Estimation

The existing printing methods for producing the printed reference pattern 12 on the reference disk 16 are such that the printed reference pattern 12 has lower resolution than the servo patterns 39. Thus, the printed reference pattern 12 is coarse relative to the servo patterns 39, and the servo patterns 39 are fine relative to the printed reference pattern 12. Generally, the reference disk 16 is manufactured in such a way that the normal read recovery process in conventional disk drives is unusable due to the extremely low bit density of the printed reference pattern 12 which is outside the range of parameters of conventional disk drive electronics. Consequently, according to an aspect of the present invention, a demodulation technique is used to obtain comparable positioning and timing accuracy. An example technique that is effective for these measurements involves using phase estimation to measure both timing and positioning error using the printed reference pattern 12.

In the example herein, the analog readback signal from the printed reference pattern 12 includes embedded servo information (e.g., the preamble, servo address mark, gray code, etc.). The recovered analog readback signal is sampled and then processed to obtain the embedded servo information and a signal representing the fundamental and higher harmonics of the readback signal (for frequency locking). The recovered signal includes the embedded servo information, and the fundamental and higher harmonics are parts of the embedded servo information. The recovered samples represent a signal waveform that has fundamental and higher order harmonics (frequencies) of the sampled signal, and the recovered samples also represent the recovered embedded servo information. The processing includes equalization, attenuation and/or amplification of the readback signal. The embedded servo information, and the fundamental and higher harmonics in the readback signal, are extracted at different times.

An embodiment provides a preferred technique for obtaining a higher resolution estimate of the burst/segment phases of the printed reference pattern 12. A measured waveform from the printed reference pattern 12 has the appearance of a train of Lorentzian pulses with alternating sign and a moderately long gap between the pulses. Provided that the duty cycle is about 50% and the positive and negative amplitudes of the pulses are equal (this is accomplished by correct biasing of the GMR read element), a Fourier decomposition of the pulse train contains only odd harmonics. An objective of this technique is to efficiently measure the in-phase and quadrature amplitudes of these odd harmonics. The measurement results are combined to generate a high-resolution measurement of the relative phase between a system clock and the readback signal.

The SNR of the phase measurement is estimated as follows. The readback signal amplitude is found by measuring the length in signal-space of the signal vector. For each readback signal harmonic of interest, this vector is provided by an arc with a radius equal to the amplitude of the harmonic, and the arc angle is provided by phase change per unit time of the vector. A consequence of this formulation is that even though the third and fifth harmonics of the readback signal have smaller amplitudes than the first harmonic (i.e., the fundamental harmonic), because they subtend a larger angle in phase space, they have a longer signal vector (i.e., higher SNR) than the fundamental harmonic. Above the fifth harmonic there can be a diminishing return in the SNR of the readback signal, and as such the focus is on measuring the amplitude of the first three odd harmonics (though it is equally applicable to higher order harmonics).

The harmonics are measured using a sampling system. An objective is to select the sampling system to permit the most efficient calculation of the harmonic amplitudes using the lowest complexity electronics. In one example, if a high speed, general purpose processor with a multiplication circuit performs on the order of 50 multiplications and 100 additions, then the preferred embodiment can include a set of accumulators to measure the average waveform of the bursts in the printed reference pattern 12 followed by a fast-Fourier transform (FFT).

However, if the multiplication capability is limited, then the signal-sampling rate is selected to permit the measurement of the amplitudes using primarily additions and subtractions. For a sinusoidal signal, a sampling scheme that requires fewer multiplications is one that samples the signal at e.g. four times the signal frequency. Multiplying the first and third sample by 1 and −1, respectively, and ignoring the even samples produces an estimate of the in-phase amplitude. The out-of-phase (or quadrature) amplitude is estimated by multiplying the second and fourth samples by 1 and −1, respectively, and ignoring the odd harmonics. The optimal sampling rate that yields information for all of these samples at the same time is found from the least common multiplier of the harmonics of interest multiplied by four (the sample rate). In this example, for the first, third, and fifth harmonics, the sample rate is selected as (3*5)*4=60 times the fundamental frequency of the printed reference pattern 12 ("*" between two values means multiplication).

To measure the fifth harmonic, 5*4=20 samples per cycle of the fundamental frequency are used. The samples are obtained by taking every third sample from the 60 samples per cycle data stream (i.e., a 3:1 decimation). The resulting samples are then multiplied by the vectors [1, 0, −1, 0 . . . . −1, 0] and [0, 1, 0, −1, . . . , 0, −1] to obtain the in-phase and quadrature components of the harmonic. Aliasing (which can occur due to sampling) can be avoided by using a filter prior to sampling the signal at the 60:1 (60×) rate. This can be performed using analog filters in the channel 21. Since the fifth harmonic is the highest spectral component being measured, the signal is filtered with a low-pass cutoff slightly above the frequency of the fifth harmonic.

To measure the third harmonic, 12 samples per cycle (12×) of the fundamental frequency are used (i.e., the decimation of the 60:1 rate signal is performed in a 5:1 ratio). Since there can be significant energy in the $9^{th}$ harmonic (the alias of the $3^{rd}$ harmonic after decimation), the 60:1 rate signal can be filtered with a digital IIR filter prior to downsampling.

The first (fundamental) harmonic can be obtained similarly by downsampling either the third or fifth harmonics data stream until there are only four samples per cycle, wherein the weightings are either 0 or +/−1. In this case, a digital anti-aliasing filter can be applied to the signal before the decimation is performed to prevent an erroneous measurement due to overlapping of all the odd harmonics. An alternate method for measuring the first harmonic is a discrete Fourier transform (DFT) on the data stream from the third harmonic, wherein the selectivity is improved significantly. Since the data stream for the third harmonic has twelve samples per cycle of the first harmonic, the appropriate weights for this DFT are [cos(0), cos(30), . . . , cos(330) and (sin(0), sin(30), sin(60), . . . . , sin(330)] for the in-phase and quadrature amplitudes, respectively. In terms of coefficients, the in-phase computation corresponds to multiplication by the vector [1, 0.866, 0.5, 0, −0.5, . . . . , 0.5, 0.866]. Because multiplication by powers of two is accomplished by shifting the binary representation of the number, the above stream can be broken into two streams: (1) those in a power of two relationship (+/−1 and +/−0.5 weightings), and (2) those multiplied by the weighting +/−0.866. Once these two streams are accumulated, they can be re-combined in either the channel 21 or the drive controller 17 after multiplication by the proper weightings.

In the above example, determination of the in-phase and quadrature amplitudes is described for the first three odd harmonics. Some further computation is then performed for measuring the phase of each harmonic and then combining the results to obtain a weighted average phase. Due to the complexity of the calculations and the flexibility needed for different implementations, it is preferable to perform these operations in the control processor 27 under firmware control. The first operation to find the phase is to compute the arctangent of the ratio of the quadrature to in-phase amplitude (this operation is performed for the three odd harmonics). Since the phase wraps every 360 degrees, there will be a three-cycle ambiguity for the third harmonic and five cycles for the fifth harmonic. This ambiguity is resolved by using the first harmonic phase to determine which of the phase cycles for the third and fifth harmonics is most likely to be correct.

The above three harmonic measurements are combined to obtain an overall phase estimate. The scaling of the three phase angles is corrected by dividing each of the estimated phase angles by its corresponding harmonic. Then, taking a weighted average, the three measurements are combined (the weighting factor is a normalized reciprocal of the variance of the corresponding phase measurement).

Demodulation at Different Sampling Rates

Different data sampling rates for reading the printed reference pattern 12 and for demodulating are possible according to the present invention. Demodulation involves calculating the DFT of a periodical sequence at a particular discrete frequency. One method is the 4T demodulation (where the signal is sampled 4 times per cycle), which is used in servo signal processing to estimate the peak amplitude of a burst and in zero-phase start (ZPS) to acquire the phase of the servo preamble. The 4T demodulation methods assume that the periodical input signal is sampled 4 times per cycle. The in-phase DFT coefficients are [cos(0), cos(π/2), cos(π), cos(3π/2)]=[1, 0, −1, 0] and the quadrature DFT coefficients are [sin(0), sin(π/2), sin(π), sin(3π/2)]=[0, 1, 0, −1]. Therefore, the DFT calculation can be greatly simplified by using summation and subtraction where no multiplication is needed.

However, unlike 4T demodulation, if the input is sampled 3 times per cycle (3×), the in-phase coefficients are [1, −0.5, −0.5] and the quadrature coefficients are [0, 0.866, 0.866]=0.866*[0, 1, −1]. The calculation of the in-phase result of DFT can be implemented with simple hardware. The operation of multiplying by 0.5 can be implemented by a simple shift of the binary bits without a full functional digital multiplier. For the quadrature result of the DFT, the hardware can work as if the coefficients are [0, 1, −1]. The multiplication can be delayed until the summation is available. Whether the multiplication is executed by firmware using a processor (CPU) in the drive controller 17 or by dedicated hardware (ASIC) the complexity is much reduced.

The same technique can be applied where the input is sampled at 6 or 12 times per cycle. For the 6-sample per cycle (6×) case, the DFT coefficients are:

| In-phase:   | 1 | 0.5 | −0.5 | −1 | −0.5 | 0.5 |
| Quadrature: | 0 | x   | x    | 0  | −x   | −x  | where x is 0.866.

For the 12-sample per cycle (12×) case, the DFT coefficients are:

| In-phase:   | 1 | x   | 0.5 | 0 | −0.5 | −x  | −1 | −x   | −0.5 | −0 | 0.5 | x    |
| Quadrature: | 0 | 0.5 | x   | 1 | x    | 0.5 | 0  | −0.5 | −x   | −1 | −x  | −0.5 | where x is 0.866.

Two accumulators calculate either the in-phase or quadrature results. One accumulator accumulates those operations requiring no full multiplication, and the other accumulator accumulates those corresponding to the x coefficients. The multiplication of x is performed when all the input samples have been processed.

If the input is sampled 5 times per cycle (5×), the DFT coefficients are:

In-phase: [1.0000, 0.3090, −0.8090, 0.8090, 0.3090]≈[1, 0, 3, −8, −8, 3]/9.92

Quadrature: [0, 0.9511, 0.5878, −0.5878, −0.9511]≈[0, 8, 5, −5, −8]/8.44

Demodulation requires a multiplier for each of the in-phase and the quadrature calculations. However, the binary representations of the coefficients have no more than 2 non-zero bits. This can be used to simplify the multiplier (any performance loss due to the approximation is negligible).

Similarly, if the input is sampled 10 times per cycle (10×), the DFT coefficients are:

| In-phase:   | 1 | u | v | −v | −u | −1 | −u | −v | v  | u  |
|-------------|---|---|---|----|----|----|----|----|----|----|
| Quadrature: | 0 | y | z | z  | y  | 0  | −y | −z | −z | −y | where u=0.8090, v=0.3090, y=0.5878 and z=0.9511.

This 10-samples per cycle method can be used for the case where 20 samples per (20×) cycle are desired, wherein the DFT coefficients are:

| In-phase:   | 1 | z | u | y | v | 0 | −v | −y | −u | −z | −1 | −z | −u | −y | −v | 0  | v  | y  | u  | z  |
|-------------|---|---|---|---|---|---|----|----|----|----|----|----|----|----|----|----|----|----|----|----|
| Quadrature: | 0 | v | y | u | z | 1 | z  | u  | y  | v  | 0  | −v | −y | −u | −z | −1 | −z | −u | −y | −v | where u=0.8090, v=0.3090, y=0.5878 and z=0.9511.

In that case, control logic is used to separate the input to the demodulator into two streams, one for the odd sample indices and another for the even sample indices. Each of the streams can be regarded as the signal sampled at 10 samples per cycle (10×). Two demodulators working at 10 times per cycle can work on the two streams independently, and final results can be obtained by combining the output of the two demodulators as in a fast-Fourier transform (FFT) algorithm. An example of such a demodulation technique is described below.

Figure 10:
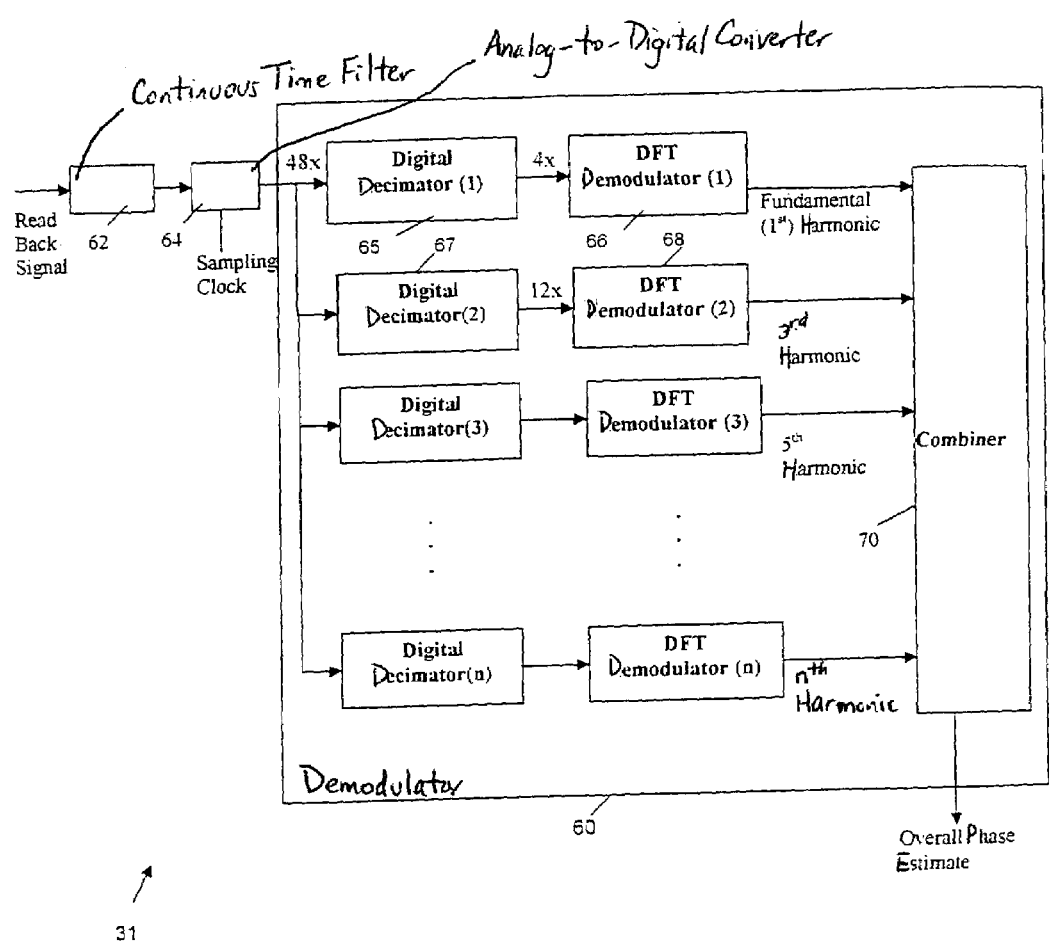
FIG. 10 shows a block diagram of a harmonic signal processor in the channel for extracting the printed reference pattern readback signal harmonics.

FIG. 10 shows a block diagram of the functional architecture of the harmonic signal processor 31. The harmonic signal processor 31 includes a demodulator 60, a continuous time filter 62 which limits the system noise and pre-shapes the readback signal, and an analog-to-digital-converter (ADC) 64 which samples the read waveform based on a sampling clock signal. The demodulator 60 further includes two data stream paths, each path comprising a digital decimator and a DFT demodulator, as it is preferable to have separate data paths for the fundamental harmonic and the higher harmonics. A preferred implementation samples the continuous time filter 62 output at 48 samples per cycle (48×), and the digital decimators are used to downsample this high rate sequence to lower rates of 4 samples per cycle (4×) and 12 samples per cycle (12×).

The ADC 64 samples the data at 48 samples per cycle (48×) and the samples are provided to both the data stream paths. In the first data stream path, a first digital decimator 65 decimates the samples from the ADC 64 to 4 samples per cycle (4×), and the decimated samples are provided to a first DFT demodulator 66 to provide the fundamental (first) harmonic of the readback signal. In the second data stream path, a second digital decimator 67 decimates the samples from the ADC 64 to 12 samples per cycle (12×), and the decimated samples are provided to a second DFT demodulator 68 to provide the third harmonic of the readback signal. Additional data stream paths, each comprising a digital decimator and a DFT demodulator, can be included in the demodulator 60 to provide other higher harmonics (e.g., the $5^{th}$ harmonic, $9^{th}$ harmonic, etc.) of the readback signal. Thus, the demodulator 60 is not limited to the embodiment described herein. The harmonic frequency outputs of the DFT demodulators 66 and 68 are then combined in a combiner 70 to obtain an overall phase estimate.

In another version, the channel 21 provides printed media self-servo write support based on extraction of the fundamental harmonic. This feature can be implemented with two digital filters and downsamplers, wherein the decimator in the channel 21 takes in 32 samples per cycle (32×) of the preamble and produces 4 samples per cycle (4×) of the preamble.

Decimators

Figure 11A:
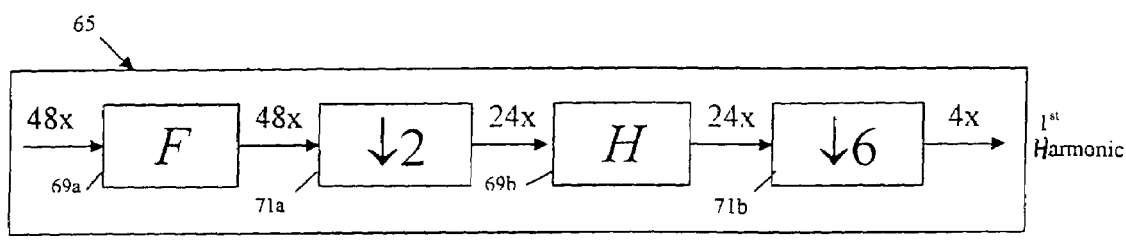
FIG. 11A shows a first digital decimator in the harmonic signal processor.
Figure 12A:
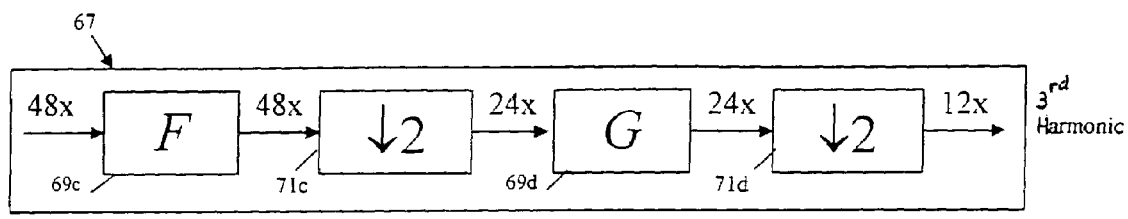
FIG. 12A shows a second digital decimator in the harmonic signal processor.

FIG. 11A shows an example architecture for the first digital decimator 65, and FIG. 12A shows an example architecture for the second digital decimator 67. As shown in FIG. 11A, the first digital decimator 65 comprises two digital filters 69a and 69b with transfer functions F and H, respectively, a first downsampler 71a for downsampling output of the filter 69a (F) by 2, and a second downsampler 71b for downsampling the output of the filter 69b (H) by 6. As shown in FIG. 12A, the second digital decimator 67 comprises two digital filters 69c and 69d with transfer functions F and G, respectively, a first downsampler 71c for downsampling the output of the filter 69c (F) by 2, and a second downsampler 71d for downsampling the output of the filter 69d (G) by 2.

Figure 13:
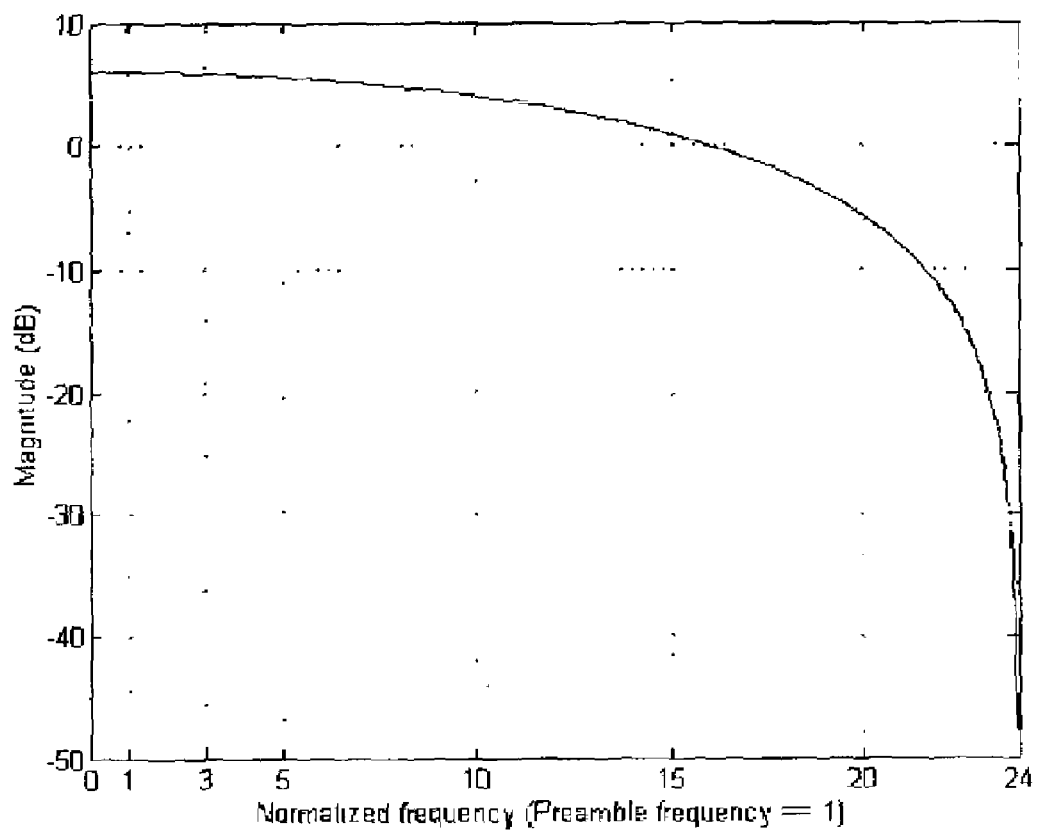
FIGS. 13–16 show example transfer functions for the filters in the digital decimators.
Figure 14:
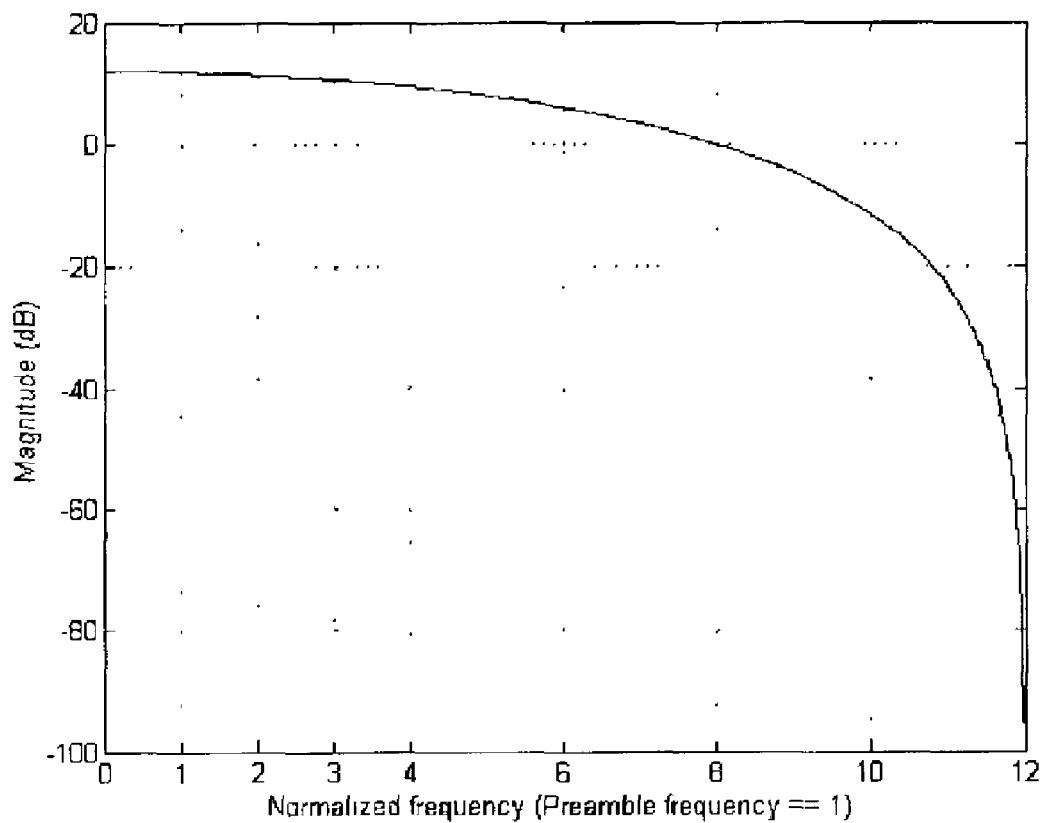
Figure 15:
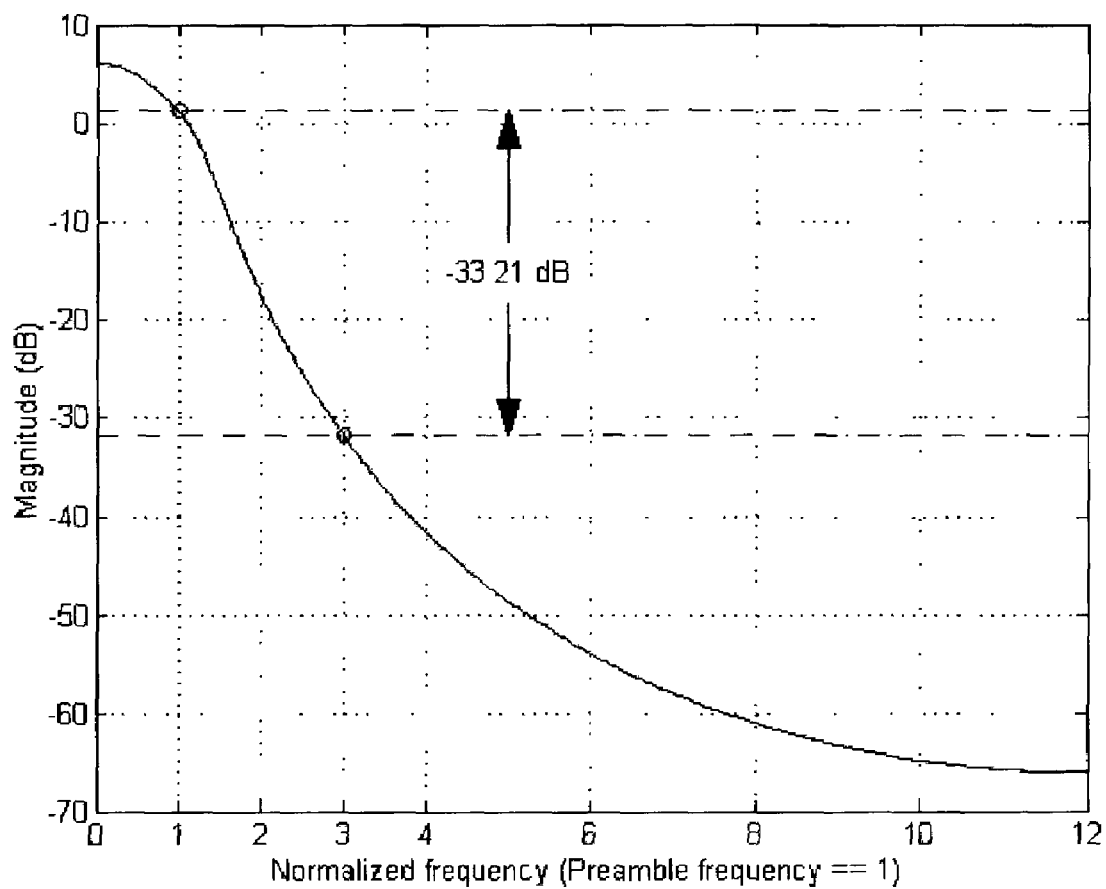

In the decimators 65 and 67, the digital filters with transfer functions F and G are used to selectively suppress (attenuate) some higher order harmonics. FIG. 13 shows an example transfer function $F=1+z^{-1}$ and FIG. 14 shows an example transfer function (low-pass) $G=1+2z^{-1}+z^{-2}$. FIG. 15 shows an example transfer function (low-pass) H, wherein:

$$H = \frac{\frac{2}{32}}{\left(1 - \frac{54}{32}z^{-1} + \frac{23}{32}z^{-2}\right)} \cdot \frac{\frac{3}{32}}{\left(1 - \frac{54}{32}z^{-1} + \frac{25}{32}z^{-2}\right)}.$$

Figure 16:
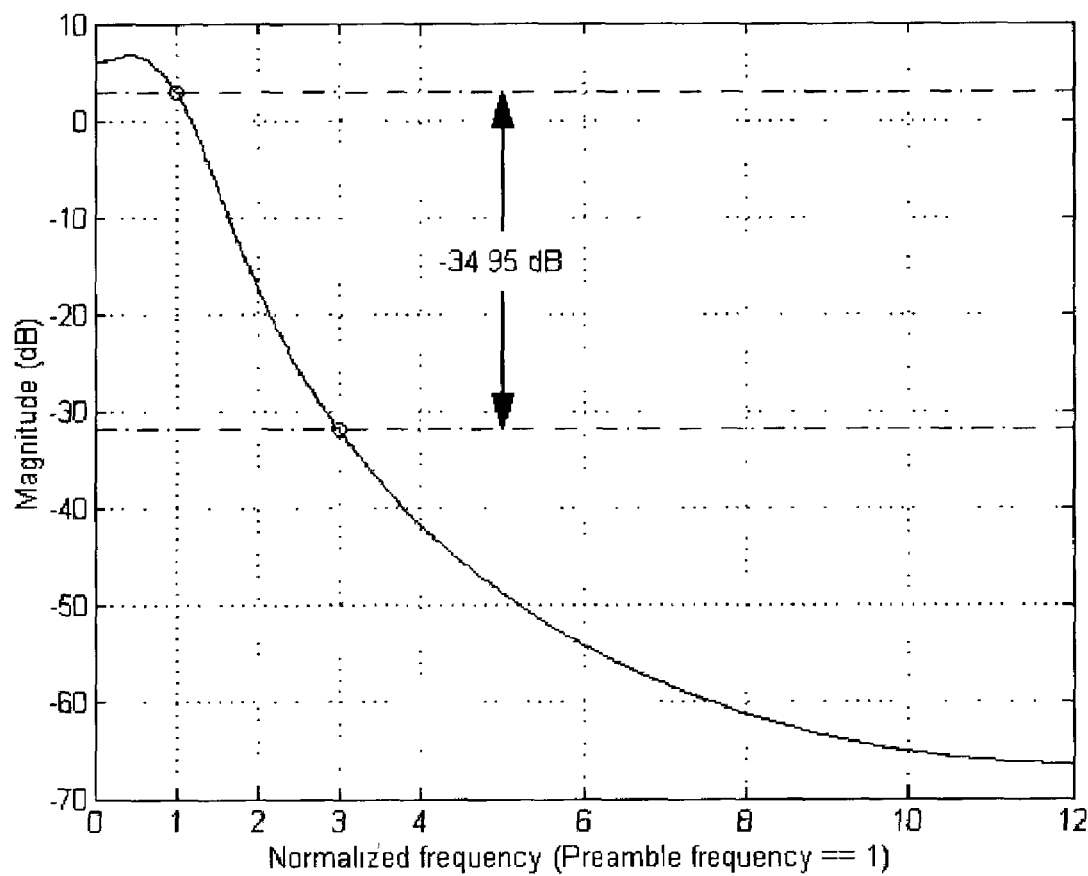

FIG. 16 shows another example transfer function H, wherein:

$$H = \frac{\frac{2}{32}}{\left(1 - \frac{56}{32}z^{-1} + \frac{25}{32}z^{-2}\right)} \cdot \frac{\frac{3}{32}}{\left(1 - \frac{54}{32}z^{-1} + \frac{25}{32}z^{-2}\right)}.$$

The transfer function H includes a low-pass characteristic. In addition, the filter 69b with transfer function H can equalize the incoming signal to the EPR4 ([1, 1, −1, −1]) target. The two example transfer functions H have 4 poles and more than 30 dB suppression of the $3^{rd}$ harmonic over the fundamental harmonic. The coefficients in the transfer functions can be represented by a limited number of binary bits.

Other sampling rates can be used to obtain different harmonics of the readback signal. For example, the ADC 64 samples can be at 30 samples per cycle (30×) for measuring the fundamental harmonic (with 3T and 6T DFT demodulation options), 10 samples per cycle (10×) for measuring the $3^{rd}$ harmonic (with 5T demodulation option), and 6 samples per cycle (6×) for measuring the $5^{th}$ harmonic (with 3T and 6T DFT demodulation options).

In another example, the ADC 64 samples can be at 15 samples per cycle (15×) for measuring the fundamental harmonic (with 3T and 5T DFT demodulation options), 5 samples per cycle (5×) for measuring the $3^{rd}$ harmonic (with 5T DFT demodulation option), and 3 samples per cycle (3×) for measuring the $5^{th}$ harmonic (with 3T DFT demodulation option).

The decimation operation includes downsampling a sequence of samples which are sampled at a higher rate. Thus, the downsampler is part of the decimation process. The filters in the decimators reduce the alias that occurs during the sampling process. Therefore, a decimator can include multiple sections, each having an optional digital anti-aliasing filter followed by a downsampler.

Figure 11B:
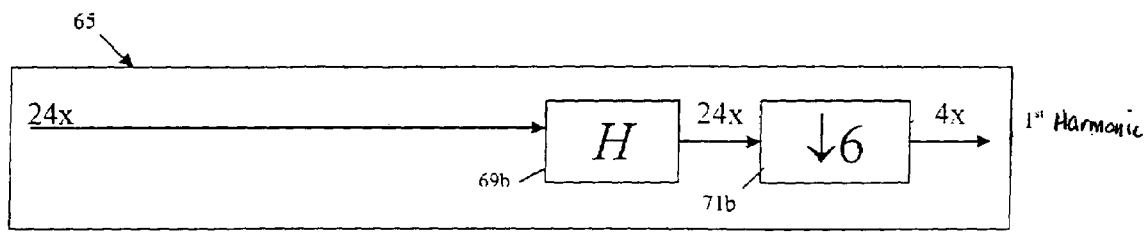
FIG. 11B shows another first digital decimator in the harmonic signal processor.
Figure 12B:
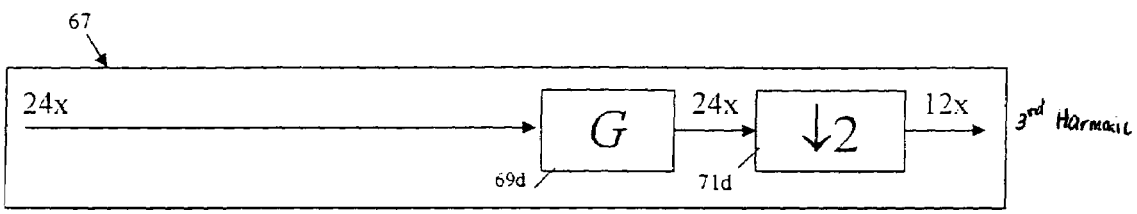
FIG. 12B shows another second digital decimator in the harmonic signal processor.

Referring to FIGS. 11B and 12B, in another example, the decimators 65 and 67 are fed with samples at 24×. In FIGS. 11A and 12A, the filters 69a and 69c (F filters) are omitted. The decimator 65 uses the filter 69b (H filter) and the 6× downsampler 71b, as shown in FIG. 11B, to provide data for first harmonic demodulation. Further, the decimator 67 uses the filter 69d (G filter) and the 2× downsampler 71d, as shown in FIG. 12B, to provide data for third harmonic demodulation. The transfer function for the filters 69b (H filter) and 69d (G filter) can be as described above.

Figure 11C:
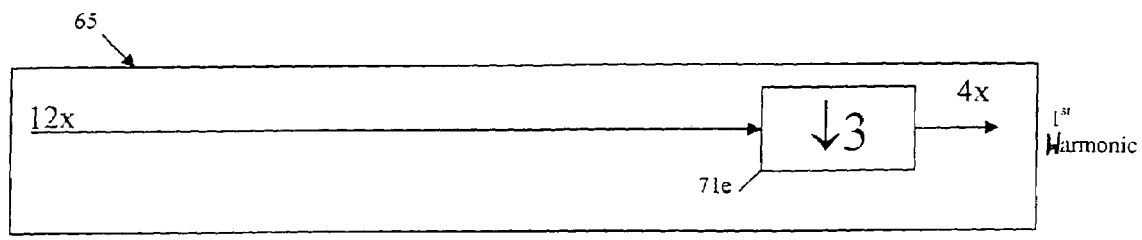
FIG. 11C shows another first digital decimator in the harmonic signal processor.
Figure 12C:
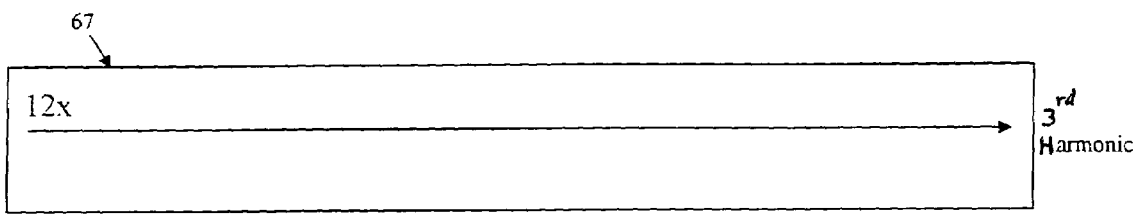
FIG. 12C shows another second digital decimator in the harmonic signal processor.

Referring to FIGS. 11C and 12C, yet in another version, the decimators 65 and 67 are fed with samples at 12×. As shown in FIG. 11C, the samples are downsampled in the decimator 65 by a 3× down-sampler 71e to generate 4× samples for the first harmonic demodulation. As shown in FIG. 12C, the 12× samples are used directly for third harmonic demodulation (FIG. 12C). In both cases, the filters are omitted.

The different decimators described in FIGS. 11A–C and 12A–C, and others, can be selective modes in the channel 21 selected by control signals to selectively utilize the sampling rates and filters shown.

Combination

The harmonic measurements are combined in the combiner 70 (FIG. 10) to obtain an overall phase estimate. To do so, the scaling of the phase angles is corrected by dividing each of the estimated phase angles by its corresponding harmonic. Then, taking a weighted average, the harmonic measurements are combined. The weighting factor is a normalized reciprocal of the variance of the corresponding phase measurement.

Optimal combination of the measured harmonics by the combiner 70 can be according to the following relations depending on the number of measured harmonics to be combined. An example relation for combining two independent random variables $a_1$ and $a_2$ into the variable a is:

$$a = \frac{\sigma_2^2 a_1 + \sigma_1^2 a_2}{\sigma_1^2 + \sigma_2^2}$$

wherein $\sigma_1^2$ and $\sigma_2^2$ are variances for variables $a_1$ and $a_2$, respectively. The first harmonic can be variable $a_1$ and the $3^{rd}$ harmonic can be variable $a_2$.

Another relation for combining three independent random variables $a_1$, $a_2$ and $a_3$ into the variable a is:

$$a = \frac{\sigma_2^2 \sigma_3^2 a_1 + \sigma_1^2 \sigma_3^2 a_2 + \sigma_1^2 \sigma_2^2 a_3}{\sigma_1^2 \sigma_2^2 + \sigma_2^2 \sigma_3^2 + \sigma_1^2 \sigma_3^2}$$

wherein $\sigma_1^2$, $\sigma_2^2$ and $\sigma_3^2$ are variances for variables $a_1$, $a_2$ and $a_3$, respectively. The first harmonic can be variable $a_1$, the $3^{rd}$ harmonic can be variable $a_2$ and the $5^{th}$ harmonic can be variable $a_3$.

A general relation for combining n independent random variables $a_1, a_2, \ldots, a_n$ into the variable a is:

$$a = \frac{1}{\sum_{j=1}^{n} \frac{1}{\sigma_j^2}} \sum_{k=1}^{n} \frac{a_k}{\sigma_k^2}$$

wherein $\sigma_1^2, \sigma_2^2, \ldots, \sigma_n^2$ are variances for variables $a_1, a_2, \ldots, a_n$, respectively, and the combination minimizes variance.

Figure 17:
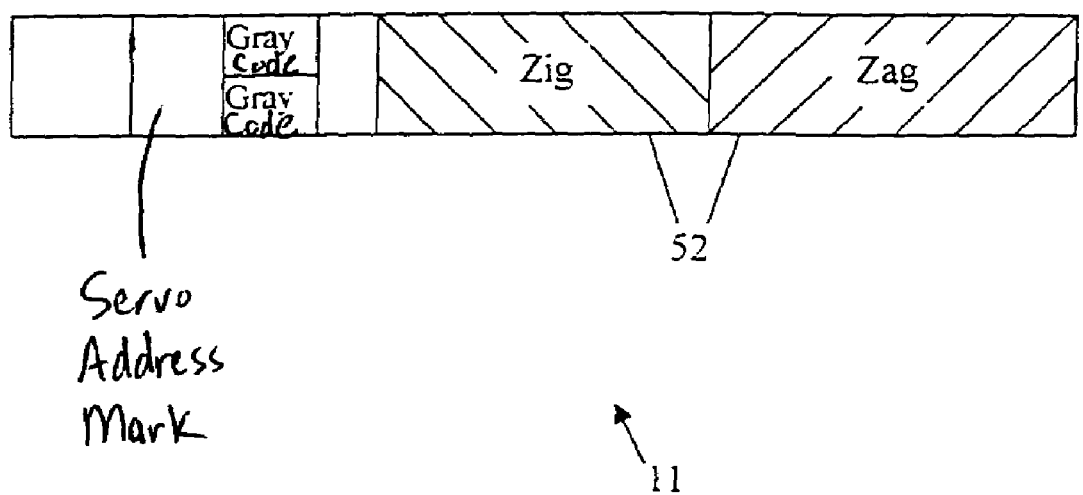
FIG. 17 shows an enlarged schematic plan view of a portion of a spoke in the printed reference pattern.

Referring back to FIG. 10, in one implementation, the DFT demodulator functions can be implemented in the channel 21. In another implementation described below, the DFT demodulator functions can be implemented in the drive controller 17, providing multi-burst, multi-harmonic burst-phase demodulation in the channel 21 where most computation can be performed in the drive controller 17 and/or the servo controller 15. In that case, the readback signal from the printed bursts (e.g., zig-zag bursts or chevrons or slanted segments 52 of the spokes 11 shown in FIG. 17) is processed by the channel 21 and sent as a stream of the ADC 64 samples over a no-return-to-zero (NRZ) bus to the drive controller 17. The drive controller 17 selectively groups and discards the samples to demarcate the stream into an arbitrary number of burst windows, and performs DFT demodulation to generate an overall burst phase estimate.

For example, a demodulation of a 5T cycle requires sine and cosine sequence coefficients with magnitudes of sin 72°, cos 72°, sin 144°, cos 144°. Two sequences of simpler coefficient sequences in the following table yield phase and magnitude results of acceptable accuracy that require less complex hardware to calculate.

| | Cosine sequence | Sine sequence |
|---|---|---|
| Precise | 1, cos 72°, cos 144°, cos 144°, cos 72° | 0, sin 72°, sin 144°, −sin 144°, −sin 72° |
| Decimal | 1, 0.309, −0.809, −0.809, 0.309 | 0, 0.951, 0.588, −0.588, −0.951 |
| Approx. | 10, 3, −8, −8, 3 | 0, 8, 5, −5, 8 |
| Scale | 9.92 | 8.44 |

The coefficients in the above approximations are DC-balanced. The binary representation of numbers 3, 5 and 10 each have only two 1's, and multiplication by these coefficients can be performed with a single addition (multiply by 8 is simple bit shifting). Since the sequences are not unity-gain, a correction factor must be applied before the sine and cosine accumulations for magnitude of phase calculations, wherein (1) the squares of these accumulations can be normalized by multiplying the square of the cosine accumulation by ¾ (similar to steps in 3T and 6T demodulation) before adding to the square of the sine, and (2) the quotient obtained from the (cosine accumulator)/(sine accumulator) calculation is scaled by 0.85 before an arctangent lookup (from a table). This scaling can be implemented in the form of a multiply as an artifact of arctangent table or as a constant addition in a log-arctangent lookup method.

Figure 18:
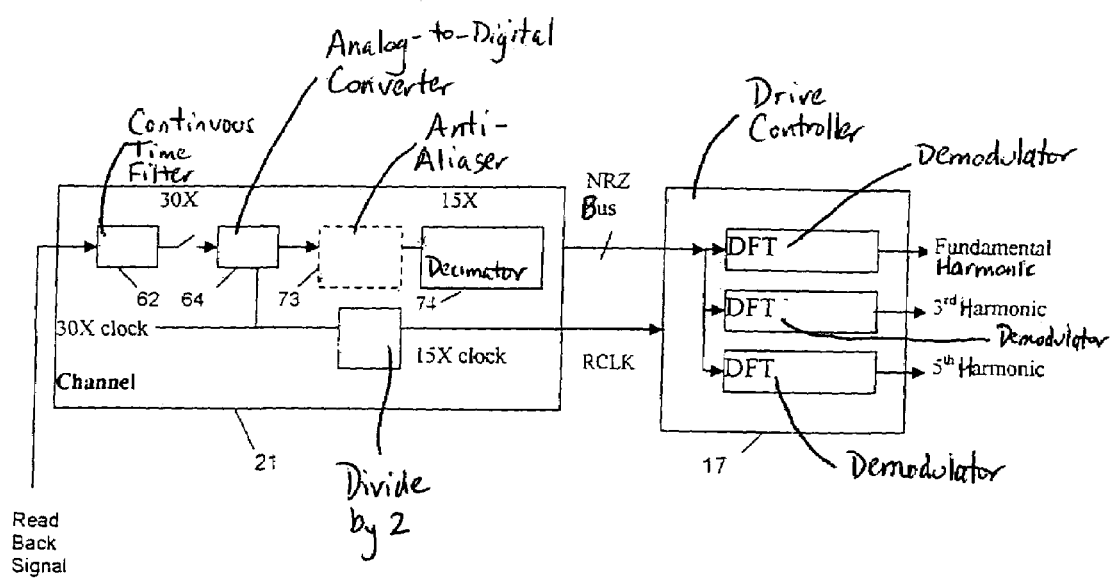
FIG. 18 shows a functional block diagram of another embodiment of the channel and the drive controller.

In one example, the printed segments/bursts of the printed reference pattern 12 can have a period of about 90 nS, which translates into 3 nS per sample for 30 samples per cycle (30×) vs. 6 nS per sample for 15 samples per cycle (15×). As shown in FIG. 18, the readback signal is sampled by the ADC 64 at 30 samples per cycle (30×) optionally anti-aliased by an anti-aliaser 73, downsampled to 15× by a decimator 74, and output to the drive controller 17 for DFT demodulation. The decimator 74 can comprise one or more digital decimators, such as the digital decimators 65 and 67 of FIG. 10. In another case, the readback signal is sampled by the ADC 64 at 15 samples per cycle (15×) and output to the drive controller 17 for DFT demodulation (in one or more DFT demodulators). This relies on low even-harmonic content of the readback signal and even harmonics are folded back onto odd harmonics to relax anti-aliasing requirements.

DFT Demodulator

Figure 19:
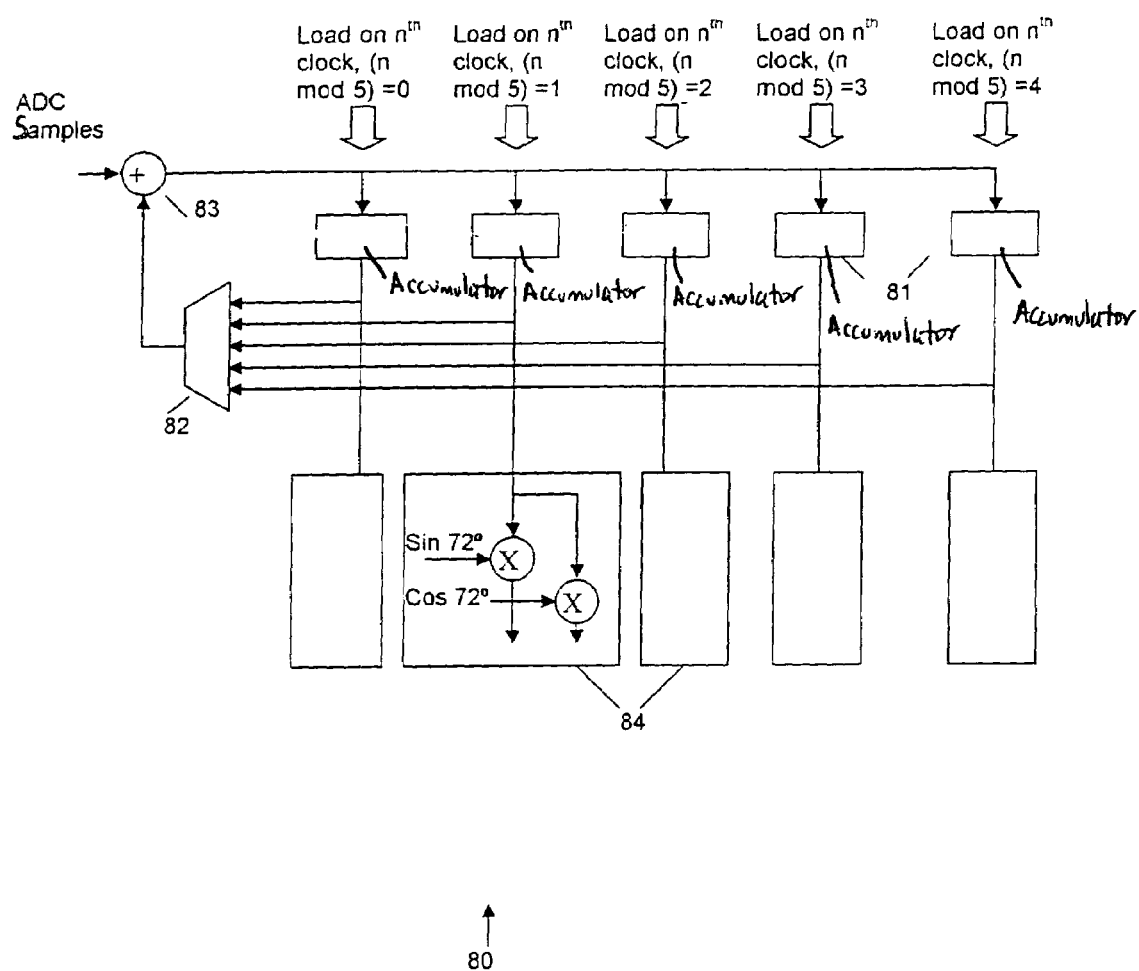
FIG. 19 shows a functional block diagram of a demodulator in the drive electronics.

In an "nT" demodulator system, every $n^{th}$ sample is multiplied by the same two sine and cosine coefficients. Hence, the coefficient multiplication can be distributed, allowing the DFT demodulators (e.g., the demodulators 66 and 68 in FIG. 10) to be implemented with a set of n accumulators such as the demodulator 80 in FIG. 19. Each accumulator 81 adds every $n^{th}$ sample in sequence via a sequence controlled multiplexer 82 and an adder 83. In the demodulator 80, after reading a pattern burst is complete, each accumulation can be multiplied by the appropriate sine or cosine coefficient in a multiplier 84. Since this multiplication is performed once, there is less multiplication penalty, providing feasible to use precise coefficients instead of hardware-efficient approximations. This also allows firmware-assisted demodulation in which the hardware (the channel 21) accumulates the appropriately grouped samples and the firmware (the drive controller 17) performs all the mathematics.

Figure 20:
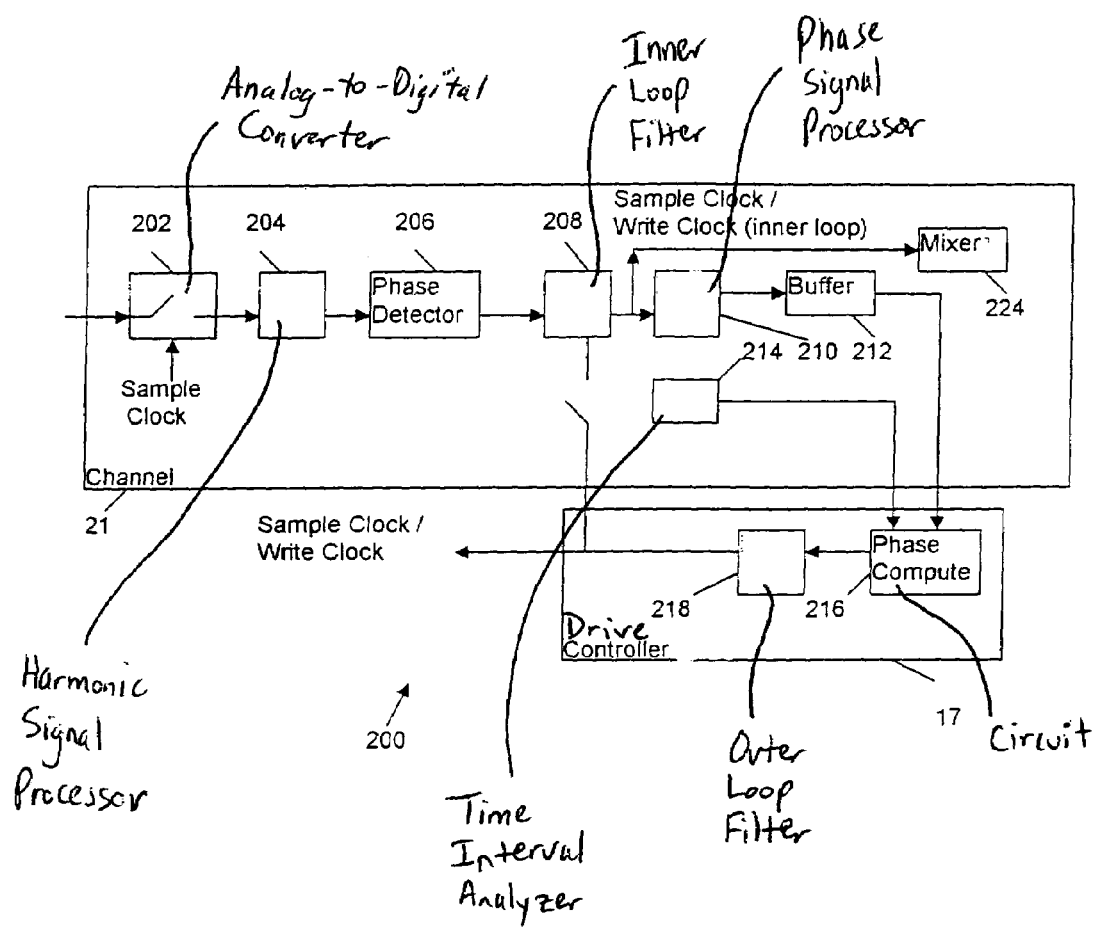
FIG. 20 shows a functional block diagram of another embodiment of the channel and the drive controller.

Referring to FIG. 20, the present invention provides an architecture for the read and write sections of the channel 21 and the drive controller 17 that uses phase estimates from the printed reference pattern 12 for self-servo writing. According to one example, phase extraction extracts the pattern phase from the printed reference pattern 12, and phase modulation eliminates any mechanical runout (e.g., printed reference pattern 12 eccentricity) due to standard assembly, using a combination of hardware and software signal processing. The entire system can be contained within the channel 21 and the drive controller 17 and requires no external devices or process steps during the disk drive manufacturing process.

Overall Channel Operation

In FIG. 20, the drive electronics 40 includes a control system 200 comprising a phase timing process loop in the channel 21 and a phase modulation process loop in the drive controller 17 to recover the pattern phase information of the printed reference pattern 12. The control system 200 is a higher level system than the servo and read/write electronics, and is deactivated during normal user operation when the disk drive 22 is in normal customer use without self-servo write operations. As such, the control system 200 has no impact on normal high speed operation and critical timing paths of the drive electronics 40.

Self-servo writing is accomplished by using the printed reference pattern 12 readback waveform/signal from which the phase and radial position of the head 34 is extracted using the phase estimation process described above. In addition, a coherent write waveform generated by a de-skewed internal channel time-base is used to format (i.e., servo write) the reference disk 16 and the disks 18 (which are blank at this stage) in the disk drive 22 with the servo patterns 39.

The control system 200 provides phase control and time signal processing and comprises the channel 21 and the drive controller 17. In this embodiment, the channel 21 includes an ADC 202, a harmonic signal processor 204 (such as the harmonic signal processor 31), a phase detector 206, an inner loop filter 208, a phase signal processor 210, a buffer 212 and a time interval analyzer 214. The drive controller 17 implements a phase compute circuit 216 and an outer loop filter 218. The outer loop filter 218 includes an integrator implemented in software and a loop gain factor optimized to remove the sinusoidal pattern eccentricity of the manufacturing printing process and the manufacturing disk misregistration. The control system 200 provides two control loops for phase extraction: (1) the first control loop (inner loop or phase timing loop) in the channel 21 for the high speed bit-level phase extraction/acquisition, and (2) the second control loop (outer loop or phase modulation loop) in the channel 21 and the drive controller 17 for removing manufacturing and mechanical phase variations such as the eccentricity of the printed reference pattern 12 and the misregistration of the reference disk 16.

One purpose of the phase extraction is to develop a high speed phase coherent clock (the write clock or the disk-locked clock in FIG. 7) that can write the servo patterns 39 with fine pitch using the relatively coarse pitch of the printed reference pattern 12. In one example version, a ratio of 8 to 1 is used between the servo patterns 39 and the printed reference pattern 12 (other ratios are possible). In that case, for processing the printed reference pattern 12 readback signal, instead of running the channel 21 at full speed, the channel 21 is effectively shut down every 7 clocks and turned back on every $8^{th}$ clock. This requires minimal change in the standard signal processing of the channel 21 for customer use.

In the self-servo write process, the eccentricity of the printed reference pattern 12 is measured. Thereafter, the drive electronics 40 uses timing and position information from the phase estimates of the printed reference pattern 12 to maintain the head 34 in concentric circular tracks (e.g., using the timing segments 50 and/or slanted segments 52 and the measured eccentricity information). At the same time, while the printed reference pattern 12 rotates under the head 34, a phase locked timing loop (within the inner loop) uses the timing information in the spokes 11 to generate a sample clock (i.e., the disk-locked clock) for digital sampling of the preamble and the slanted segments 52. The sampled values are used (1) in the inner loop to correctly detect and decode the embedded servo address mark and track number information, (2) in the outer loop to obtain timing information whereby the head 34 radial position is determined, and (3) to obtain a phase difference between the write clock (i.e., a reference clock synthesized in the channel 21 for writing the servo patterns 39) and the sample clock.

Thus, it can be determined when to start and stop writing the servo patterns 39 on the reference disk 16 between each pair of consecutive spokes 11 and on the disks 18 by generating the write clock to be in-phase (coherent) with the disk-locked clock.

For self-servo writing, a servo data phase lock loop is used in the inner loop for timing recovery with modifications to process the readback waveform from the printed reference pattern 12. The modifications have no impact on the normal performance of the channel 21 or the drive controller 17 during standard user operation. This allows using the channel 21 and the drive controller 17 for (1) reading the printed reference pattern 12 for removing pattern eccentricity and for self-servo writing the servo patterns 39, and (2) normal servo and read/write operations for user data. For normal operation of the disk drive 22, when the channel 21 is not used to read/write user data, the channel 21 is used to read servo information from the disks 16 and 18, the analog servo data is digitally sampled using a DFT and burst phase values in the servo patterns 39 are determined in the channel 21. The burst phase values are provided to the drive electronics 40 to generate a position error signal (PES) to control the head actuator assembly 28 for proper positioning of the heads 34 and 36. During normal operation, the outer loop is not used for servoing. An example of using phase estimates, based on fundamental harmonic of the readback signal from a printed reference pattern in control loops for removing eccentricity and in self-servo writing is described in the commonly assigned patent application Ser. No. 09/903,445, filed Jul. 8, 2001, entitled "Self-writing Of Servo Patterns In Disk Drives", incorporated herein by reference, and described briefly by example below.

In order to use the same signal processing logic (i.e., the channel 21 and the drive controller 17) to recover phase information for self-servo writing and for normal user operations, the incoming readback signal from the printed reference pattern 12 is digitized in the ADC 202, and the harmonic signal processor 204 extracts the harmonic content of the read waveform from the digitized readback signal.

The phase detector 206, in the inner loop, processes the synchronous samples from the harmonic signal processor 204 and samples the peaks and zeros of the preamble waveform in each spoke 11, which under nominal conditions is similar to a sine wave. The phase detector 206 further detects the shoulders, non-peaks and zeros during the servo address mark in each spoke 11. The results are converted to a phase number by taking the difference of the even and odd samples, and the phase information is sent to the inner loop filter 208 for generating a sample clock phase error from the read waveform. The inner loop filter 208 provides proportional and integral compensation for converting the phase error into a compensation signal to a clock delay control. The inner loop provides a delay-locked loop such that the phase delay of the ADC 202 clock is modulated to minimize the phase error obtained at the output of the phase detector 206.

The sample clock signal drives the ADC 202 when the head 34 is over the spokes 11 (or the servo patterns 39 in normal operation) and after the head 34 moves off a spoke 11 (e.g., in self-servo writing the servo patterns 39 are written between the spokes 11). For writing the servo patterns 39, a desired phase/clock (the synthesized clock) is synthesized (i.e., the write clock). The write clock is close in phase to the sample clock, and is modulated by the outer loop as controlled by the drive controller 17. Thus, effectively the write clock is modulated using the printed reference pattern 12 while writing the servo patterns 39 and is a combination of (1) the recovered clock in the printed reference pattern 12 via the time interval analyzer 214, and (2) the synthesized clock in the channel 21 controlled by the outer loop of the drive controller 17. The synthesized clock is synthesized and contained in the channel 21, but is controlled/modulated by the drive controller 17 to generate the write clock, as described further below.

The printed reference pattern 12 readback waveform is sampled and the relevant phase information from the readback signal is extracted using the harmonic signal processor 204. The phase information is filtered by the inner loop filter 208 to produce a correction signal that modulates a clock that manifests itself in the sampled signals which are processed by the phase detector 206 to close the inner loop. The value of the gains in the integral and the inner loop filter 208 are adjusted to provide optimum acquisition speeds. As such, the phase information from the inner loop is used to control a timing loop within the inner loop with enough precision to obtain the servo digital information and the gray code.

The inner loop phase information represents the difference between the synthesized clock and the phase of the printed reference pattern 12 during the gray code of each spoke 11. The inner loop phase information controls the timing loop which allows the drive controller 17 to find the servo address mark in each spoke 11. Once the servo address mark is found, the timing measurements and sine/cosine calculations using the disk-locked clock can begin. Further, a counter that measures a time interval from the end of the servo address mark to slightly before the next servo address mark is started.

The sample clock is coherent with the preamble of each spoke 11. While the printed reference pattern 12 rotates under the head 34, in a timing loop within the inner loop the timing information in the spokes 11 is used to generate the sample clock for digital sampling of the preamble and the slanted segments 52 by extracting harmonics in each spoke 11. The eccentricity of the printed reference pattern 12 relative to the disk surface 14 produces a phase advance or delay around the track. The sample clock multiplexes the clock signals generated by the inner and outer timing loops. As such, the sample clock is the same as the ADC 202 clock. The sample clock switches its source as the head 34 moves over the various fields of the reference disk 16. To sample the slanted segments 52, the sample clock is generated at the outer timing loop output (i.e., the disk-locked clock). To sample the preamble, servo address mark and gray code, and the sample clock is generated at the inner timing loop output. The write clock is only relevant when the servo patterns 39 are being written, and in that case the write clock becomes the same as the disk-locked clock.

Using the precise measurement of timing (e.g., by measuring the time interval between the servo address marks precisely with a high speed clock in the channel 21, and even more precisely by a DFT of the slanted segments 52), the synthesized clock and the reference disk 16 are synchronized to generate the disk-locked clock for sampling the slanted segments 52. This can be accomplished either by adjusting the motor torque or by adjusting the frequency of the synthesized clock based on the measured timing relationship between the synthesized clock and the reference disk 16 at each servo address mark. The sample clock locked to the preamble is used only to sample the preamble, servo address mark and gray code, and the disk-locked clock is used to sample the slanted segments 52.

Referring back to FIG. 20, the phase signal processor 210 computes the sine and cosine values of the printed reference pattern 12 readback samples by a DFT. The phase signal processor 210 computes the phase components needed for a software based phase compute. The phase signal processor 210 inputs are derived from the phase detector 206, and the phase signal processor 210 computes the even and odd samples of the printed reference pattern 12 waveform samples using a correlated detector that detects the sine and cosine values of the slanted segments 52. The phase signal processor 210 integrates the samples that represent the sine values and integrates the samples that represent the cosine values, averages those samples, and creates accurate sine and cosine numbers which are provided to the phase compute circuit 216 via the buffer 212.

In one example, the phase signal processor 210 comprises a correlation based detector that depends on four expected slanted segment 52 samples per cycle where each cycle is a sinusoidal waveform. Thus, each sample corresponds to the in-phase and quadrature samples (sine and cosine). These samples are each averaged to produce a sine and cosine signal that is passed to the buffer 212 for further processing in the phase compute circuit 216 to extract the phase of the printed reference pattern 12 via an inverse tangent (arctangent) function. Correlation of the data with a DFT is obtained by observing that the samples of the sine component are obtained by an alternate-add algorithm on the odd samples, while samples of the cosine component are obtained by an alternate-add algorithm on the even samples. The running sum is integrated into an accumulator at the beginning of the slanted segment 52, then loaded to the drive controller 17 and cleared at the end of the slanted segment 52.

In the drive controller 17, the phase compute circuit 216 generates the phase of the printed reference pattern 12 for driving the outer timing loop by computing the arctangent of the sine/cosine sample values, thereby providing an accurate phase number. The components are obtained through a data bus transaction whereby the sine and cosine values are transferred from the phase signal processor 210 to the drive controller 17 which in turn computes the phase using a software algorithm.

The head 34 radial position can be determined by prior knowledge of the format of the printed reference pattern 12. Given the measured phase of the slanted segments 52 (computed in the phase compute circuit 216 as the arctangent of the even and odd sine and cosine of the sample values) and the expected phase (using the track number and offset), a phase difference is determined and converted into a radial position error. The head 34 circumferential position is determined by counting the number of spokes 11 after an index identifier per track, and the index identifier is determined by a special gray code embedded in the printed reference pattern 12.

The time interval measurement of the time interval analyzer 214 is input to the phase compute circuit 216 (e.g., via a serial port in the drive controller 17) once per passage of each spoke 11 under the head 34 to determine the difference between the channel clock (sample clock) and the disk-locked clock. The time interval analyzer 214 counts the disk-locked clock samples with higher precision than that available to the drive controller 17.

In one example, a precise time interval measurement is obtained using the time interval analyzer 214 by sampling the disk-locked clock with the clock generated by the inner control loop (the sample clock). The time interval measurement is read by the drive controller 17 once per spoke 11 to determine the difference between the synthesized clock and the disk-locked clock. The outputs of the phase compute circuit 216 and time interval analyzer 214 are fed to the outer loop filter 218 to control the phase of the synthesized clock to generate the write clock to the required precision for writing the servo patterns 39 (1) interlaced with the spokes 11 on the disk surface 14 of the reference disk 16, and (2) on the disk surfaces 38 of the disks 16 and 18.

The outer loop includes the phase compute circuit 216 and the outer loop filter 218, and the outer loop filter 218 includes an integrator and an adder whose gain values are set to control a proportional and integral feedback term to the channel 21. The output of the phase compute circuit 216 is fed to the outer loop filter 218 to control the phase of the synthesized clock with the required precision to generate the write clock for writing the servo patterns 39 interlaced with the spokes 11, and to sample the slanted segments 52 in a phase coherent manner. Under normal operation of the channel 21 for servoing during data read/write operations, a position error signal (PES) for the head 34 is determined by the amplitude of the bursts in the servo patterns 39 or a subset thereof. However, for self-servo writing, the phase computation for the slanted segments 52 is accomplished by the inverse tangent technique in the phase compute circuit 216 to determine the head 34 radial position. The measured phases of the slanted segments 52 are also used with time interval measurements of the time interval analyzer 214 for the outer loop phase computation. In this example, the time interval analyzer 214 uses a downsampled version of the sample clock. The phase information from the phase signal processor 210 provides the radial position information and also the phase for the outer loop. The outer loop adjusts the zero-start phase location (initial phase estimate) of the ADC 202 to have zero runout per revolution.

A phase lock is achieved at every spoke 11 to generate the sample clock in the inner loop. At the end of the preamble, servo address mark and gray code in each spoke 11, the clock is switched to the disk-locked clock and used in the ADC 202 to sample the slanted segments 52 as they pass under the head 34. The eccentricity of mounting the reference disk 16 on the spindle 20 and/or of the printed reference pattern 12 can cause frequency variation on a once around revolution. As the slanted segments 52 pass under the head 34, a DFT determines their phases, and the phases are input to the phase signal processor 210 which determines phase numbers for the phase compute circuit 216 to generate the burst phase values. A curve-fitting routine fits a sine wave to the once around runout due to eccentricity. The measured chevron (burst) phases are used to adjust the outer loop phase to take out the once around runout eccentricity.

The outer loop filter 218 filters the resulting phase from the phase compute circuit 216 (obtained by extraction from the coherent phase information) to provide highly precise frequency error information for modulating the synthesized clock coherently from spoke 11 to spoke 11 and across adjacent tracks to generate the write clock. The write clock (which is normally used for writing the user data on the disks 16 and 18) is traditionally reset at each servo address mark but remains coherent from track-to-track by means of the disk-locked clock. The data write clock can be used to write the servo patterns 39.

The servo patterns 39 can have many formats as known in the art (e.g., staggered servo bursts laid across the disk tracks) for normal servo operation. The servo patterns 39 on the disk surface 14 exist inside the open areas of the printed reference pattern 12 (e.g., between the spokes 11) and are concentric with the axis of the spindle 20. The servo patterns 39 are written into the region immediately following the slanted segments 52 in each spoke 11 and are staggered in time from the reference disk 16 to the disks 18 in a manner that allows simultaneous self-servo writing of the servo patterns 39 on the disk surfaces 14 and 38 in one rotation of the spindle 20 (i.e., a staggered-write).

Further, the inner loop filter 208 provides rapid phase error reduction during the beginning of the spoke 11 for self-servo writing (and the servo patterns 39 for normal read/write operations) by computing a compensation value that is fed to a delay control (e.g., a mixer 224) which modulates the ADC 202 clock in a negative feedback fashion. The inner control loop includes the ADC 202, the harmonic signal processor 204, the phase detector 206, the inner loop filter 208 and the mixer 224. The phase signal processor 210 is controlled by a self-servo write clock that is set to the disk-locked clock when the phase signal processor 210 is used.

With the head 34 at the OD of the reference disk 16, a target phase due to eccentricity is measured on one track at the OD of the reference disk 16 for all the spokes 11. A phase lock loop (the inner loop) is used to acquire phase lock on the spoke 11 and read the servo address mark and gray code. The outer loop is then used to disk-lock the clock to the printed reference pattern 12, thereby generating a stable phase coherent disk-locked clock. The angular position of the head 34 relative to the recovered signal (i.e., the filtered ADC 202 samples with unwanted harmonics removed) is known and used to measure and store the phase at various angles around the reference disk 16. This phase information is used to compute an eccentricity profile which becomes the target phase that is subtracted from the outer loop feedback signal. This provides a very stable reference signal (i.e., the disk-locked clock) that is used for writing the servo patterns 39. Therefore, the outer loop is held constant while the servo address mark is found and the gray code is read in the inner loop, and then the outer loop is started to compensate for the known eccentricity (refining the model of the eccentricity until the disk-locked clock is stable).

Therefore, the inner loop and the outer loop are used cooperatively. The inner loop is used to obtain enough phase information to properly detect the servo address mark and read the gray code, and thereafter the outer loop is used to measure and correct the phase information for reading the slanted segments 52 to generate the disk-locked clock (write clock) for writing the servo patterns 39.

The disk-locked clock is used as write clock for self-servo writing. When the head 34 is over each spoke 11, the disk-locked clock is the same as the sample clock for sampling the slanted segments 52. When the head 34 is not over a spoke 11, the disk-locked clock is the same as the write clock for writing the servo patterns 39 between the spokes 11.

The present invention has been described in considerable detail with reference to certain preferred versions thereof; however, other versions are possible. For example, it should be clear to those skilled in the art that the present invention may also be used in conjunction with other servo patterns and storage devices that use servo patterns. Therefore, the spirit and scope of the appended claims should not be limited to the description of the preferred versions contained herein.

What is claimed is:

1. A synchronous sampling data detection circuit for a disk drive, wherein the disk drive includes a head and a reference disk, the reference disk includes a printed reference pattern transferred by magnetic printing, the printed reference pattern includes embedded servo information, and the disk drive positions the head using the embedded servo information to self-write servo patterns on the reference disk, the data detection circuit comprising:
    a digital sampler that synchronously samples an analog readback signal at a sample rate and generates digital samples representing the analog readback signal, wherein the head provides the analog readback signal in response to reading the printed reference pattern, the analog readback signal includes a fundamental harmonic and a higher harmonic, and the fundamental and higher harmonics represent the embedded servo information;
    a harmonic signal processor that receives the digital samples and generates recovered samples representing the fundamental and higher harmonics; and
    a control loop that extracts the embedded servo information from the recovered samples.

2. The data detection circuit of claim 1, wherein the printed reference pattern includes interlaced spokes with a long dimension generally in a radial direction of the reference disk.

3. The data detection circuit of claim 2, wherein the spokes are arcs.

4. The data detection circuit of claim 1, wherein the embedded servo information includes head position information.

5. The data detection circuit of claim 4, wherein the embedded servo information includes radially spaced slanted segments that provide the head position information.

6. The data detection circuit of claim 5, wherein the embedded servo information includes substantially radial isochronal segments.

7. The data detection circuit of claim 5, wherein the embedded servo information includes a preamble, a servo address mark and a gray code.

8. The data detection circuit of claim 5, wherein the slanted segments are zig-zag chevrons.

9. The data detection circuit of claim 1, wherein the higher harmonic is an odd harmonic.

10. The data detection circuit of claim 9, wherein the higher harmonic is a third harmonic.

11. The data detection circuit of claim 1, wherein the analog readback signal includes the fundamental harmonic, the higher harmonic and a second higher harmonic, the fundamental harmonic and the higher harmonics represent the embedded servo information, and the recovered samples represent the fundamental harmonic and the higher harmonics.

12. The data detection circuit of claim 11, wherein the higher harmonics are odd harmonics.

13. The data detection circuit of claim 12, wherein the higher harmonics are third and fifth harmonics.

14. The data detection circuit of claim 1, wherein the harmonic signal processor includes a first data stream path that extracts the fundamental harmonic from the digital samples, a second data stream path that extracts the higher harmonic from the digital samples, and a combiner that takes a weighted average of the extracted fundamental and higher harmonics.

15. The data detection circuit of claim 14, wherein the combiner provides a phase estimate of the fundamental and higher harmonics.

16. The data detection circuit of claim 14, wherein the first data stream path includes a first digital decimator and the second data stream path includes a second digital decimator.

17. The data detection circuit of claim 16, wherein the first data stream path includes a first demodulator and the second data path includes a second demodulator.

18. The data detection circuit of claim 1, wherein the disk drive overwrites the printed reference pattern with user data after self-writing the servo patterns.

19. A synchronous sampling data detection circuit for a disk drive, wherein the disk drive includes a head and a reference disk, the reference disk includes a printed reference pattern transferred by magnetic printing, the printed reference pattern includes embedded servo information that provides servo timing and head position information, and the disk drive positions the head at concentric tracks on the reference disk using the embedded servo information to self-write servo patterns on the tracks, the data detection circuit comprising:
  a digital sampler that synchronously samples an analog readback signal at a sample rate and generates digital samples representing the analog readback signal, wherein the head provides the analog readback signal in response to reading the printed reference pattern, the analog readback signal includes a fundamental harmonic and a higher harmonic, and the fundamental and higher harmonics represent the embedded servo information;
  a harmonic signal processor that receives the digital samples and generates recovered samples representing the fundamental and higher harmonics; and
  a control loop that extracts the embedded servo information from the recovered samples.

20. The data detection circuit of claim 19, wherein the printed reference pattern includes interlaced spokes with a long dimension generally in a radial direction of the reference disk, and the spokes include radially spaced slanted segments that provide the head position information.

21. The data detection circuit of claim 20, wherein the spokes are arcs and the slanted segments are zig-zag chevrons.

22. The data detection circuit of claim 19, wherein the harmonic signal processor equalizes a waveform spectrum of the digital samples.

23. The data detection circuit of claim 19, wherein the harmonic signal processor amplifies the fundamental and higher harmonics of the digital samples.

24. The data detection circuit of claim 19, wherein the harmonic signal processor attenuates unwanted harmonics of the digital samples.

25. The data detection circuit of claim 19, wherein the harmonic signal processor includes a decimator that extracts the fundamental and higher harmonics from the digital samples.

26. The data detection circuit of claim 25, wherein the decimator includes a low-pass filter that attenuates unwanted harmonics of the digital samples.

27. The data detection circuit of claim 26, wherein the decimator includes a downsampler for downsampling an output of the low-pass filter at a downsample rate of N to 1, where N represents an integer ratio of a resolution of the servo patterns to the printed reference pattern.

28. The data detection circuit of claim 27, wherein N represents a ratio of the sample rate to the downsample rate.

29. The data detection circuit of claim 19, wherein the harmonic signal processor includes a decimator and a demodulator that extract the fundamental and higher harmonics from the digital samples.

30. The data detection circuit of claim 19, wherein the harmonic signal processor includes:
  a first data stream path that includes a first decimator and a first demodulator that extract the fundamental harmonic from the digital samples; and
  a second data stream path that includes a second decimator and a second demodulator that extract the higher harmonic from the digital samples.

31. The data detection circuit of claim 30, wherein the first decimator includes in series (i) a first digital filter that suppresses unwanted harmonics, (ii) a first downsampler that reduces the sample rate, (iii) a second digital filter that is a low-pass filter, and (iv) a second downsampler.

32. The data detection circuit of claim 31, wherein:
  the first digital filter has an input sample rate of 48×;
  the first downsampler reduces an output sample rate of the first digital filter by a factor of 2;
  the second digital filter has an input sample rate of 24×; and
  the second downsampler reduces an output sample rate of the second digital filter by a factor of 6, whereby the first decimator has an output sample rate of 4×.

33. The data detection circuit of claim 31, wherein:
  the first digital filter has an input sample rate of 48× and a transfer function F:

$$F=1+z^{-1};$$

the first downsampler reduces an output sample rate of the first digital filter by a factor of 2;
  the second digital filter has an input sample rate of 24× and a transfer function H:

$$H = \frac{\frac{2}{32}}{\left(1 - \frac{56}{32}z^{-1} + \frac{25}{32}z^{-2}\right)} \cdot \frac{\frac{3}{32}}{\left(1 - \frac{54}{32}z^{-1} + \frac{25}{32}z^{-2}\right)};$$

and
  the second downsampler reduces an output sample rate of the second digital filter by a factor of 6, whereby the first decimator has an output sample rate of 4×.

34. The data detection circuit of claim 30, wherein the second decimator includes in series (i) a first digital filter that suppresses unwanted harmonics, (ii) a first downsampler that reduces the sample rate, (iii) a second digital filter that is a low-pass filter, and (iv) a second downsampler.

35. The data detection circuit of claim 34, wherein:
  the first digital filter has an input sample rate of 48×;
  the first downsampler reduces an output sample rate of the first digital filter by a factor of 2;
  the second digital filter has an input sample rate of 24×; and
  the second downsampler reduces an output sample rate of the second digital filter by a factor of 2, whereby the first decimator has an output sample rate of 12×.

36. The data detection circuit of claim 34, wherein:
  the first digital filter has an input sample rate of 48× and a transfer function F:

$$F=1+z^{-1};$$

the first downsampler reduces an output sample rate of the first digital filter by a factor of 2;
  the second digital filter has an input sample rate of 24× and a transfer function G:

$$G=1+2z^{-1}+z^{-2}; \text{ and}$$

the second downsampler reduces an output sample rate of the second digital filter by a factor of 2, whereby the first decimator has an output sample rate of 12×.

37. The data detection circuit of claim 30, wherein the harmonic signal processor includes a combiner that combines the extracted fundamental and higher harmonics and generates a phase estimate of the printed reference pattern.

38. The data detection circuit of claim 19, wherein the harmonic signal processor includes three data stream paths, and each data stream path includes a decimator and a demodulator that extract a separate harmonic from the digital samples.

39. The data detection circuit of claim 38, wherein the harmonic signal processor includes a combiner that combines the extracted harmonics and generates a phase estimate of the printed reference pattern.

40. The data detection circuit of claim 38, wherein each decimator has a frequency cut-off essentially at a frequency of the corresponding separate harmonic.

41. The data detection circuit of claim 19, wherein the control loop uses the fundamental and higher harmonics to obtain a phase lock to extract a track identification and a servo address mark from the embedded servo information.

42. The data detection circuit of claim 19, including a detector that receives the digital samples and detects a preamble in the embedded servo information.

43. The data detection circuit of claim 42, including a timing loop that receives an output of the detector and generates a timing signal for sampling the analog readback signal at the sample rate.

44. The data detection circuit of claim 42, including a phase signal processor that receives an output of the detector and generates timing information.

45. The data detection circuit of claim 44, including a phase compute circuit that receives the timing information and measures a phase of the printed reference pattern.

46. The data detection circuit of claim 45, wherein the phase compute circuit calculates an inverse tangent of a function of a ratio of odd and even samples of the digital samples.

47. The data detection circuit of claim 46, including a circuit that determines a radial position of the head using prior knowledge of a format of the printed reference pattern, the measured phase and an expected phase of the printed reference pattern.

48. The data detection circuit of claim 46, wherein the control loop includes an outer loop that uses the measured phase to modulate a synthesized clock that provides a phase coherent clock for self-writing the servo patterns.

49. The data detection circuit of claim 19, wherein:
the harmonic signal processor includes a time interval analyzer for measuring time intervals corresponding to a speed of rotation of the printed reference pattern; and
the control loop includes an outer loop that uses a measured phase of the printed reference pattern and the time intervals to modulate a synthesized clock that provides a phase coherent clock for self-writing the servo patterns.

50. The data detection circuit of claim 49, wherein:
the digital sampler includes a low frequency reference sampler; and
the control loop controls the low frequency reference sampler based on digital phase recovery of low frequency servo information from the printed reference pattern.

51. The data detection circuit of claim 19, wherein the data detection circuit reads and writes user data to and from the reference disk during normal data recording and retrieval operations.

52. The data detection circuit of claim 19, wherein the disk drive overwrites the printed reference pattern with user data after self-writing the servo patterns.

53. A self-servo writing disk drive, comprising:
a head;
a reference disk including a printed reference pattern transferred by magnetic printing, wherein the printed reference pattern includes embedded servo information;
a spindle motor for rotating the reference disk;
a synchronous sampling data detection circuit including:
a digital sampler that synchronously samples an analog readback signal at a sample rate and generates digital samples representing the analog readback signal, wherein the head provides the analog readback signal in response to reading the printed reference pattern, the analog readback signal includes a fundamental harmonic and a higher harmonic, and the fundamental and higher harmonics represent the embedded servo information;
a harmonic signal processor that receives the digital samples and generates recovered samples representing the fundamental and higher harmonics; and
a control loop that extracts the embedded servo information from the recovered samples; and
a controller that positions the head using the extracted embedded servo information as the disk drive self-writes servo patterns on the reference disk.

54. The disk drive of claim 53, wherein the printed reference pattern includes interlaced spokes with a long dimension generally in a radial direction of the reference disk, and the spokes include radially spaced slanted segments that provide the head position information.

55. The disk drive of claim 54, wherein the spokes are arcs and the slanted segments are zig-zag chevrons.

56. The disk drive of claim 53, wherein the harmonic signal processor equalizes a waveform spectrum of the digital samples.

57. The disk drive of claim 53, wherein the harmonic signal processor amplifies the fundamental and higher harmonics of the digital samples.

58. The disk drive of claim 53, wherein the harmonic signal processor attenuates unwanted harmonics of the digital samples.

59. The disk drive of claim 53, wherein the harmonic signal processor includes a decimator that extracts the fundamental and higher harmonics from the digital samples.

60. The disk drive of claim 59, wherein the decimator includes a low-pass filter that attenuates unwanted harmonics of the digital samples.

61. The disk drive of claim 60, wherein the decimator includes a downsampler for downsampling an output of the low-pass filter at a downsample rate of N to 1, where N represents an integer ratio of a resolution of the servo patterns to the printed reference pattern.

62. The disk drive of claim 61, wherein N represents a ratio of the sample rate to the downsample rate.

63. The disk drive of claim 53, wherein the harmonic signal processor includes a decimator and a demodulator that extract the fundamental and higher harmonics from the digital samples.

64. The disk drive of claim 53, wherein the harmonic signal processor includes:
a first data stream path that includes a first decimator and a first demodulator that extract the fundamental harmonic from the digital samples; and
a second data stream path that includes a second decimator and a second demodulator and that extract the higher harmonic from the digital samples.

65. The disk drive of claim 64, wherein the first decimator includes in series (i) a first digital filter that suppresses unwanted harmonics, (ii) a first downsampler that reduces the sample rate, (iii) a second digital filter that is a low-pass filter, and (iv) a second downsampler.

66. The disk drive of claim 65, wherein:
the first digital filter has an input sample rate of 48×;
the first downsampler reduces an output sample rate of the first digital filter by a factor of 2;
the second digital filter has an input sample rate of 24×; and
the second downsampler reduces an output sample rate of the second digital filter by a factor of 6, whereby the first decimator has an output sample rate of 4×.

67. The disk drive of claim 65, wherein:
the first digital filter has an input sample rate of 48× and a transfer function F:

$F=1+z^{-1}$;

the first downsampler reduces an output sample rate of the first digital filter by a factor of 2;
the second digital filter has an input sample rate of 24× and a transfer function H:

$$H = \frac{\frac{2}{32}}{\left(1 - \frac{56}{32}z^{-1} + \frac{25}{32}z^{-2}\right)} \cdot \frac{\frac{3}{32}}{\left(1 - \frac{54}{32}z^{-1} + \frac{25}{32}z^{-2}\right)};$$

and
the second downsampler reduces an output sample rate of the second digital filter by a factor of 6, whereby the first decimator has an output sample rate of 4×.

68. The disk drive of claim 64, wherein the second decimator includes in series (i) a first digital filter that suppresses unwanted harmonics, (ii) a first downsampler that reduces the sample rate, (iii) a second digital filter that is a low-pass filter, and (iv) a second downsampler.

69. The disk drive of claim 68, wherein:
the first digital filter has an input sample rate of 48×;
the first downsampler reduces an output sample rate of the first digital filter by a factor of 2;
the second digital filter has an input sample rate of 24×; and
the second downsampler reduces an output sample rate of the second digital filter by a factor of 2, the first decimator has an output sample rate of 12×.

70. The disk drive of claim 68, wherein:
the first digital filter has an input sample rate of 48× and a transfer function F:

$F=1+z^{-1}$;

the first downsampler reduces an output sample rate of the first digital filter by a factor of 2;
the second digital filter has an input sample rate of 24× and a transfer function G:

$G=1+2z^{-1}+Z^{-2}$; and the second downsampler reduces an output sample rate of the second digital filter by a factor of 2, the first decimator has an output sample rate of 12×.

71. The disk drive of claim 64, wherein the harmonic signal processor includes a combiner that combines the extracted fundamental and higher harmonics and generates a phase estimate of the printed reference pattern.

72. The disk drive of claim 53, wherein the harmonic signal processor includes:
three data stream paths, wherein each data stream path includes a decimator and a demodulator that extract a separate harmonic from the digital samples; and
a combiner that combines the extracted harmonics and generates a phase estimate of the printed reference pattern.

73. The disk drive of claim 72, wherein each decimator has a frequency cut-off essentially at a frequency of the corresponding separate harmonic.

74. The disk drive of claim 53, wherein the data detection circuit includes a detector that receives the digital samples and detects a preamble in the embedded servo information.

75. The disk drive of claim 74, wherein the data detection circuit includes a timing loop that receives an output of the detector and generates a timing signal for sampling the analog readback signal at the sample rate.

76. The disk drive of claim 74, wherein the data detection circuit includes a phase signal processor that receives an output of the detector and generates timing information.

77. The disk drive of claim 76, wherein the data detection circuit includes a phase compute circuit that receives the timing information and measures a phase of the printed reference pattern.

78. The disk drive of claim 77, wherein the phase compute circuit calculates an inverse tangent of a function of a ratio of odd and samples of the digital samples.

79. The disk drive of claim 78, wherein the data detection circuit includes a circuit that determines a radial position of the head using prior knowledge of a format of the printed reference pattern, the measured phase and an expected phase of the printed reference pattern.

80. The disk drive of claim 78, wherein the control loop includes an outer loop that uses the measured phase to modulate a synthesized clock that provides a phase coherent clock for self-writing the servo patterns.

81. The disk drive of claim 53, wherein:
the harmonic signal processor includes a time interval analyzer for measuring time intervals corresponding to a speed of rotation of the printed reference pattern; and
the control loop includes an outer loop that uses a measured phase of the printed reference pattern and the time intervals to modulate a synthesized clock that provides a phase coherent clock for self-writing the servo patterns.

82. The disk drive of claim 53, wherein the disk drive overwrites the printed reference pattern with user data after self-writing the servo patterns.

83. A method for disk drive self-servo writing, comprising:
(a) transferring a reference pattern by magnetic printing onto a reference disk, wherein the printed reference pattern includes embedded servo information;
(b) installing the reference disk and a head into a head-disk assembly;
(c) reading the printed reference pattern from the reference disk using the head to generate an analog readback signal that includes a fundamental harmonic and a higher harmonic that represent the embedded servo information;
(d) sampling the analog readback signal at a sample rate to generate digital samples;
(e) processing the digital samples to generate recovered samples representing the fundamental and higher harmonics;

(f) extracting the embedded servo information from the recovered samples; and (g) self-writing servo patterns on the reference disk using the extracted embedded servo information to position the head.

84. The method of claim 83, wherein the embedded servo information includes timing segments that provide servo timing information.

85. The method of claim 84, wherein the timing segments are substantially radial.

86. The method of claim 83, wherein the embedded servo information includes position segments that provide head position information.

87. The method of claim 86, wherein the head position information includes head circumferential and radial position information.

88. The method of claim 87, wherein the position segments are slanted.

89. The method of claim 87, wherein the position segments are zig-zag chevrons.

90. The method of claim 83, wherein the embedded servo information includes timing segments that provide servo timing information and position segments that provide head position information.

91. The method of claim 83, wherein the timing segments are substantially radial and the position segments are slanted.

92. The method of claim 91, wherein the servo timing information is provided by substantially radial timing segments, and the head position information is provided by slanted segments.

93. The method of claim 83, wherein the embedded servo information provides servo timing and head circumferential and radial position information.

94. The method of claim 83, wherein:
step (b) includes installing a second disk and a second head into the head-disk assembly, wherein the second disk is installed as a blank disk; and
step (g) includes self-writing the servo patterns on the second disk using the extracted embedded servo information to position the second head.

95. The method of claim 94, wherein step (g) includes stagger writing the servo patterns on the disks.

96. The method of claim 83, wherein step (e) includes equalizing a waveform spectrum of the digital samples.

97. The method of claim 93, wherein step (e) includes amplifying the fundamental and higher harmonics of the digital samples.

98. The method of claim 83, wherein step (e) includes attenuating unwanted harmonics of the digital samples.

99. The method of claim 98, wherein the unwanted harmonics include all even harmonics.

100. The method of claim 98, wherein the unwanted harmonics include all harmonics above the fifth harmonic.

101. The method of claim 98, wherein the unwanted harmonics include all even harmonics and all harmonics above the fifth harmonic.

102. The method of claim 98, wherein the unwanted harmonics exclude the first and third harmonics.

103. The method of claim 98, wherein the unwanted harmonics exclude the first, third and fifth harmonics.

104. The method of claim 98, wherein the unwanted harmonics include the second and fourth harmonics and all harmonics above the fifth harmonic and exclude the first, third and fifth harmonics.

105. The method of claim 98, wherein the unwanted harmonics include the second harmonic and all harmonics above the third harmonic and exclude the first and third harmonics.

106. The method of claim 98, wherein step (e) includes folding even harmonics of the digital samples back onto odd harmonics of the digital samples to reduce anti-aliasing.

107. The method of claim 83, wherein step (e) includes attenuating unwanted harmonics of the digital samples and folding even harmonics of the digital samples back onto odd harmonics of the digital samples to reduce anti-aliasing.

108. The method of claim 83, wherein step (f) includes using the extracted embedded servo information to measure eccentricity of the printed reference pattern.

109. The method of claim 83, wherein step (f) includes using the extracted embedded servo information to measure timing non-uniformity of the printed reference pattern.

110. The method of claim 83, wherein step (f) includes using the extracted embedded servo information to measure eccentricity and timing non-uniformity of the printed reference pattern.

111. The method of claim 110, including counteracting at least one of the measured eccentricity and timing non-uniformity before self-writing the servo patterns.

112. The method of claim 83, wherein:
step (f) includes obtaining phase information about the printed reference pattern based on the extracted embedded servo information and generating a phase coherent clock based on the phase information; and
step (g) includes using the phase coherent clock to self-write the servo patterns in relation to the printed reference pattern.

113. The method of claim 83, wherein step (g) includes self-writing the servo patterns in relation to printed reference pattern.

114. The method of claim 83, including obtaining eccentricity phase information corresponding to eccentricity and timing non-uniformity of the printed reference pattern, wherein:
step (f) includes generating a phase coherent clock based on the eccentricity phase information; and
step (g) includes using the phase coherent clock to self-write the servo patterns in relation to the printed reference pattern.

115. The method of claim 114, wherein step (f) includes generating the phase coherent clock based on the eccentricity phase information and the embedded servo information.

116. The method of claim 114, wherein step (f) includes:
synthesizing a clock; and
modulating the synthesized clock based on the eccentricity phase information in a phase modulation loop to generate the phase coherent clock.

117. The method of claim 116, wherein step (f) includes modulating the synthesized clock based on the eccentricity phase information and on servo timing and head position information extracted from the recovered samples to generate the phase coherent clock.

118. The method of claim 116, wherein step (f) includes:
obtaining even and odd synchronous samples of the embedded servo information from the recovered samples;
measuring a phase of the printed reference pattern based on the even and odd synchronous samples; and
modulating the synthesized clock signal based on the eccentricity phase information and the measured phase to generate the phase coherent clock.

119. The method of claim 118, wherein obtaining the even and odd synchronous samples includes sampling the embedded servo information based on the phase coherent clock.

120. The method of claim 114, including using the eccentricity phase information to counteract the eccentricity and timing non-uniformity of the printed reference pattern before self-writing the servo patterns.

121. The method of claim 114, wherein step (g) includes using the phase coherent clock to counteract the eccentricity and timing non-uniformity of the printed reference pattern before self-writing the servo patterns.

122. The method of claim 83, including obtaining servo timing information from the recovered samples and generating a sample clock based on the servo timing information for sampling the analog readback signal.

123. The method of claim 122, including:
generating a synthesized clock; and
modulating the synthesized clock based on the servo timing information to generate the sample clock.

124. The method of claim 122, wherein the embedded servo information includes preambles, and the sample clock samples the preambles.

125. The method of claim 83, wherein the printed reference pattern has a lower resolution lower than the servo patterns.

126. The method of claim 125, wherein step (e) includes attenuating unwanted harmonics of the digital samples to generate attenuated samples and synchronously downsampling the attenuated signals at a downsample rate to generate the recovered samples.

127. The method of claim 126, wherein a ratio of a resolution of the servo patterns to the printed reference pattern is an integer.

128. The method of claim 127, wherein a ratio of the sample rate to the downsample rate is an integer.

129. A synchronous sampling data detection circuit for a disk drive, wherein the disk drive includes a head and a reference disk, the reference disk includes a printed reference pattern transferred by magnetic printing, the printed reference pattern includes embedded servo information, and the disk drive positions the head using the embedded servo information to self-write servo patterns on the reference disk, the data detection circuit comprising:
a digital sampler that synchronously samples an analog readback signal at a sample rate and generates digital samples representing the analog readback signal, wherein the head provides the analog readback signal in response to reading the printed reference pattern, the analog readback signal includes a first harmonic and a third harmonic, and the first and third harmonics represent the embedded servo information;
a harmonic signal processor that receives the digital samples and generates recovered samples representing the first and third harmonics, wherein the harmonic signal processor includes (1) a first data stream path that extracts the first harmonic from the digital samples and (2) a second data stream path that extracts the third harmonic from the digital samples; and
a control loop that extracts the embedded servo information from the recovered samples.

130. The data detection circuit of claim 129, wherein:
the first data stream path includes a first decimator and a first demodulator that extract the first harmonic from the digital samples; and
the second data stream path includes a second demodulator that extracts the third harmonic from the digital samples.

131. The data detection circuit of claim 130, wherein the first decimator includes a downsampler that reduces the sample rate.

132. The data detection circuit of claim 131, wherein the downsampler reduces an input sample rate of 12× by a factor of 3, whereby the first decimator has an output sample rate of 4×.

133. The data detection circuit of claim 132, wherein an input sample rate of the second demodulator is 12×.

134. The data detection circuit of claim 129, wherein:
the first data stream path includes a first decimator and a first demodulator that extract the first harmonic from the digital samples, the first decimator includes in series a low-pass digital filter and a downsampler, and the downsampler reduces the sample rate; and
the second data stream path includes a second decimator and a second demodulator that extract the third harmonic from the digital samples.

135. The data detection circuit of claim 134, wherein:
the digital filter has an input sample rate of 24×; and
the downsampler reduces an output sample rate of the digital filter by a factor of 6, whereby the first decimator has an output sample rate of 4×.

136. The data detection circuit of claim 134, wherein:
the digital filter has an input sample rate of 24× and a transfer function H:

$$H = \frac{\frac{2}{32}}{\left(1 - \frac{56}{32}z^{-1} + \frac{25}{32}z^{-2}\right)} \cdot \frac{\frac{3}{32}}{\left(1 - \frac{54}{32}z^{-1} + \frac{25}{32}z^{-2}\right)};$$

and
the downsampler reduces an output sample rate of the digital filter by a factor of 6, whereby the first decimator has an output sample rate of 4×.

137. The data detection circuit of claim 129, wherein:
the first data stream path includes a first decimator and a first demodulator that extract the first harmonic from the digital samples; and
the second data stream path includes a second decimator and a second demodulator that extract the third harmonic from the digital samples, wherein the second decimator includes in series a low-pass digital filter and a downsampler, and the downsampler reduces the sample rate.

138. The data detection circuit of claim 137, wherein:
the second digital has an input sample rate of 24×; and
the downsampler reduces an output sample rate of the second digital filter by a factor of 2, whereby the first decimator has an output sample rate of 12×.

139. The data detection circuit of claim 137, wherein:
the second digital has an input sample rate of 24× and a transfer function G:

$G = 1 + 2z^{-1} + z^{-2}$; and the downsampler reduces an output sample rate of the second digital filter by a factor of 2, whereby the first decimator has an output sample rate of 12×.

140. The data detection circuit of claim 129, wherein the harmonic signal processor folds even harmonics of the digital samples back into odd harmonics of the digital samples to reduce anti-aliasing.

141. A self-servo writing disk drive, comprising:
a head;
a reference disk including a printed reference pattern transferred by magnetic printing, wherein the printed reference pattern includes embedded servo information providing servo timing and head position information;
a spindle motor for rotating the reference disk;
a synchronous sampling data detection circuit including:
  a digital sampler that synchronously samples an analog readback signal at a sample rate and generates digital samples representing the analog readback signal, wherein the head provides the analog readback signal in response to reading the printed reference pattern, the analog readback signal includes a first harmonic and a third harmonic, and the first and third harmonics represent the embedded servo information;
  a harmonic signal processor that receives the digital samples and generates recovered samples representing the first and third harmonics, wherein the harmonic signal processor includes (1) a first data stream path that extracts the first harmonic from the digital samples and (2) a second data stream path that extracts the third harmonic from the digital samples; and
  a control loop that extracts the embedded servo information from the recovered samples; and
a controller that positions the head using the extracted embedded servo information as the disk drive self-writes servo patterns to the reference disk.

142. The disk drive of claim 141, wherein:
the first data stream path includes a first decimator and a first demodulator that extract the first harmonic from the digital samples; and
the second data stream path includes a second demodulator that extracts the third harmonic from the digital samples.

143. The disk drive of claim 142, wherein the first decimator includes a downsampler that reduces the sample rate.

144. The disk drive of claim 143, wherein the downsampler reduces an input sample rate of 12× by a factor of 3, whereby the first decimator has an output sample rate of 4×.

145. The disk drive of claim 144, wherein an input sample rate of the second demodulator is 12×.

146. The disk drive of claim 141, wherein:
the first data stream path includes a first decimator and a first demodulator that extract the first harmonic from the digital samples, the first decimator includes in series a low-pass digital filter and a downsampler, and the downsampler reduces the sample rate; and
the second data stream path includes a second decimator and a second demodulator that extract the third harmonic from the digital samples.

147. The disk drive of claim 146, wherein:
the digital filter has an input sample rate of 24×; and
the downsampler reduces an output sample rate of the digital filter by a factor of 6, whereby the first decimator has an output sample rate of 4×.

148. The disk drive of claim 147, wherein:
the first data stream path includes a first decimator and a first demodulator that extract the first harmonic from the digital samples; and
the second data stream path includes a second decimator and a second demodulator that extract the third harmonic from the digital samples, wherein the second decimator includes in series a low-pass digital filter and a downsampler, and the downsampler reduces the sample rate.

149. The disk drive of claim 148, wherein:
the second digital has an input sample rate of 24×; and
the downsampler reduces an output sample rate of the second digital filter by a factor of 2, whereby the first decimator has an output sample rate of 12×.

150. The disk drive of claim 141, wherein the harmonic signal processor folds even harmonics of the digital samples back into odd harmonics of the digital samples to reduce anti-aliasing.

151. A synchronous sampling data detection circuit for a disk drive, wherein the disk drive includes a head and a disk, the disk includes a reference pattern, the reference pattern includes embedded servo information, and the disk drive positions the head using the embedded servo information to self-write servo patterns on the disk, the data detection circuit comprising:
a digital sampler that synchronously samples an analog readback signal at a sample rate and generates digital samples representing the analog readback signal, wherein the head provides the analog readback signal in response to reading the reference pattern, and the analog readback signal includes fundamental harmonic and higher harmonics that represent the embedded servo information;
a harmonic signal processor that receives the digital samples and generates recovered samples representing the fundamental and one or more odd harmonics and not representing any even harmonics; and
a control loop that extracts the embedded servo information from the recovered samples.

152. A synchronous sampling data detection circuit for a disk drive, wherein the disk drive includes a head and a disk, the disk includes a reference pattern, the reference pattern includes embedded servo information, and the disk drive positions the head using the embedded servo information to self-write servo patterns on the disk, the data detection circuit comprising:
a digital sampler that synchronously samples an analog readback signal at a sample rate and generates digital samples representing the analog readback signal, wherein the head provides the analog readback signal in response to reading the reference pattern, and the analog readback signal includes fundamental and higher harmonics that represent the embedded servo information;
a harmonic signal processor that receives the digital samples and generates recovered samples representing the fundamental and third harmonics and not representing the second harmonic; and
a control loop that extracts the embedded servo information from the recovered samples.

153. A synchronous sampling data detection circuit for a disk drive, wherein the disk drive includes a head and a disk, the disk includes a reference pattern, the reference pattern includes embedded servo information, and the disk drive positions the head using the embedded servo information to self-write servo patterns on the disk, the data detection circuit comprising:
a digital sampler that synchronously samples an analog readback signal at a sample rate and generates digital samples representing the analog readback signal, wherein the head provides the analog readback signal in response to reading the reference pattern, and the analog readback signal includes fundamental and higher harmonics that represent the embedded servo information;

a harmonic signal processor that receives the digital samples and generates recovered samples representing the fundamental, third and fifth harmonics and not representing the second and fourth harmonics; and a control loop that extracts the embedded servo information from the recovered samples.

154. A synchronous sampling data detection circuit for a disk drive, wherein the disk drive includes a head and a disk, the disk includes a reference pattern, the reference pattern includes embedded servo information, and the disk drive positions the head using the embedded servo information to self-write servo patterns on the disk, the data detection circuit comprising:

a digital sampler that synchronously samples an analog readback signal at a sample rate and generates digital samples representing the analog readback signal, wherein the head provides the analog readback signal in response to reading the reference pattern, and the analog readback signal includes fundamental and higher harmonics that represent the embedded servo information;

a harmonic signal processor that receives the digital samples and generates recovered samples representing only the fundamental, third and fifth harmonics; and a control loop that extracts the embedded servo information from the recovered samples.

155. A synchronous sampling data detection circuit for a disk drive, wherein the disk drive includes a head and a disk, the disk includes a reference pattern, the reference pattern includes embedded servo information, and the disk drive positions the head using the embedded servo information to self-write servo patterns on the disk, the data detection circuit comprising:

a digital sampler that synchronously samples an analog readback signal at a sample rate and generates digital samples representing the analog readback signal, wherein the head provides the analog readback signal in response to reading the reference pattern, and the analog readback signal includes fundamental and higher harmonics that represent the embedded servo information;

a harmonic signal processor that receives the digital samples and generates recovered samples representing the fundamental and selected higher harmonics, wherein the harmonic signal processor includes (1) separate data stream paths for each of the fundamental and selected higher harmonics that extract the fundamental and selected higher harmonics from the recovered samples, and (2) a combiner that combines the extracted fundamental and selected higher harmonics to generate combined recovered samples; and a control loop that extracts the embedded servo information from the combined recovered samples.

156. The data detection circuit of claim 155, wherein the selected higher harmonic is an odd harmonic.

157. The data detection circuit of claim 155, wherein the selected higher harmonics consist of odd harmonics.

158. The data detection circuit of claim 155, wherein the selected higher harmonics include the third and fifth harmonics.

159. The data detection circuit of claim 155, wherein the selected higher harmonics include the third and fifth harmonics and exclude even harmonics.

160. The data detection circuit of claim 155, wherein the selected higher harmonics consist of the third and fifth harmonics.

* * * * *